United States Patent
Hijikata et al.

(10) Patent No.: US 7,222,009 B2
(45) Date of Patent: May 22, 2007

(54) DRIVING ASSIST SYSTEM FOR VEHICLE

(75) Inventors: Shunsuke Hijikata, Kamakura (JP); Masahiro Egami, Yokosuki (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 312 days.

(21) Appl. No.: 10/943,047

(22) Filed: Sep. 17, 2004

(65) Prior Publication Data

US 2005/0065687 A1    Mar. 24, 2005

(30) Foreign Application Priority Data

Sep. 18, 2003   (JP) .............................. 2003-326500

(51) Int. Cl.
*B62D 6/00* (2006.01)
*G06F 17/00* (2006.01)

(52) U.S. Cl. .................... 701/41; 701/301; 701/70; 701/96; 340/438

(58) Field of Classification Search .................. 701/41, 701/48, 70, 74, 93, 96, 301; 180/167–169; 340/438–439
See application file for complete search history.

(56) References Cited

U.S. PATENT DOCUMENTS

| | | | | |
|---|---|---|---|---|
| 5,765,116 | A  * | 6/1998  | Wilson-Jones et al. | 701/41 |
| 6,626,061 | B2 * | 9/2003  | Sakamoto et al. | 74/512 |
| 6,974,414 | B2 * | 12/2005 | Victor | 600/300 |
| 6,982,647 | B2 * | 1/2006  | Kuge et al. | 340/576 |
| 7,162,349 | B2 * | 1/2007  | Hijikata et al. | 701/70 |
| 2003/0060936 | A1 | 3/2003 | Yamamura et al. | |

FOREIGN PATENT DOCUMENTS

| | | |
|---|---|---|
| JP | 10-166889 | 6/1998 |
| JP | 10-166890 | 6/1998 |
| JP | 2000-54660 | 2/2000 |
| JP | 2003-63430 | 3/2003 |

* cited by examiner

*Primary Examiner*—Y. Beaulieu
(74) *Attorney, Agent, or Firm*—McDermott Will & Emery LLP

(57) ABSTRACT

A driving assist system for vehicle calculates risk potential from the traveling environment of vehicle surroundings, and calculates a reference speed Vt while the vehicle is traveling. Accelerator pedal reaction force control amount is then calculated based on the risk potential RP and the reference speed Vt. The accelerator pedal reaction force is controlled so as to generate the calculated reaction force control amount, and information relating to the risk potential RP and the reference speed Vt is conveyed to the driver through sense of touch.

21 Claims, 23 Drawing Sheets

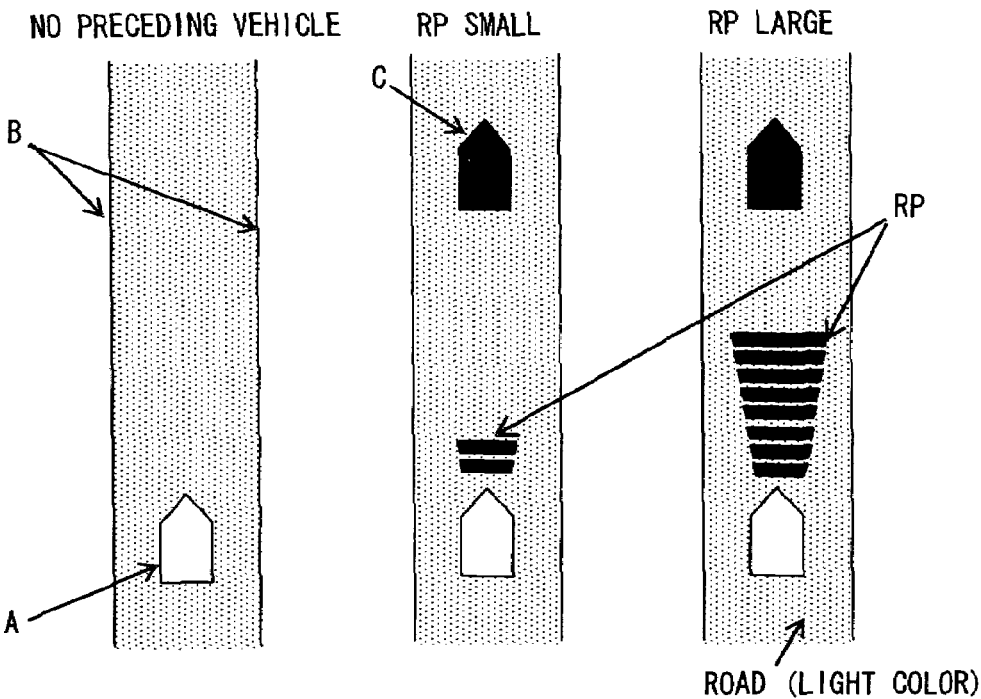
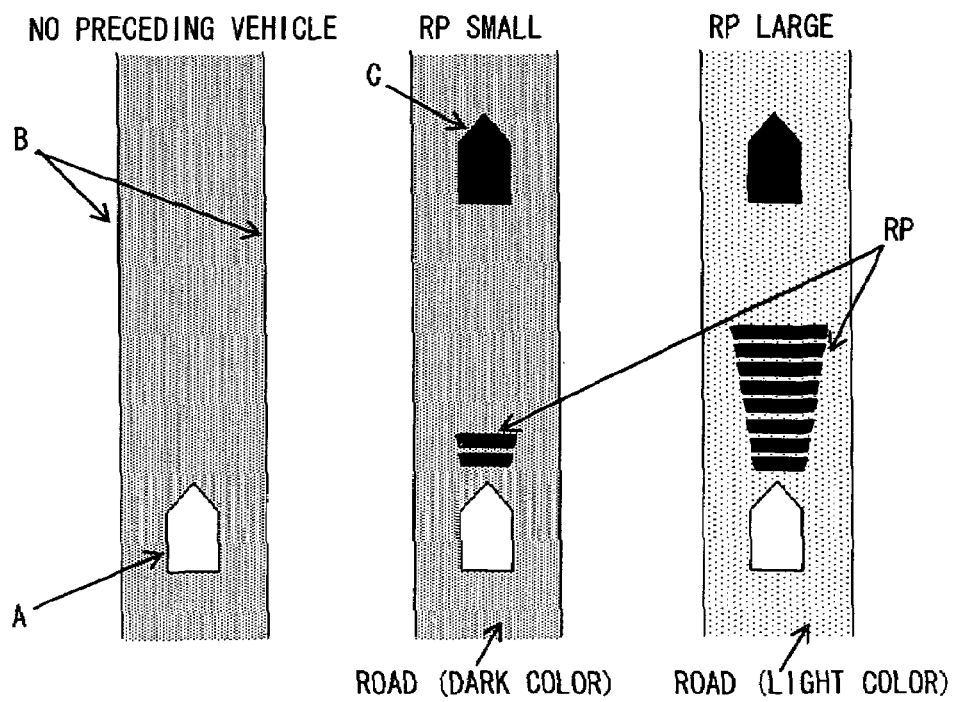

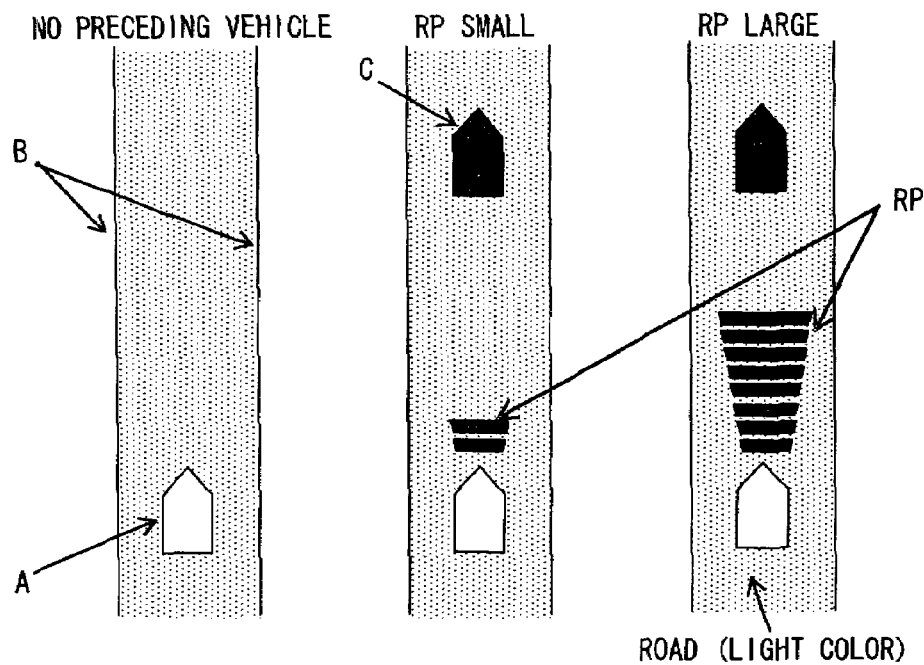
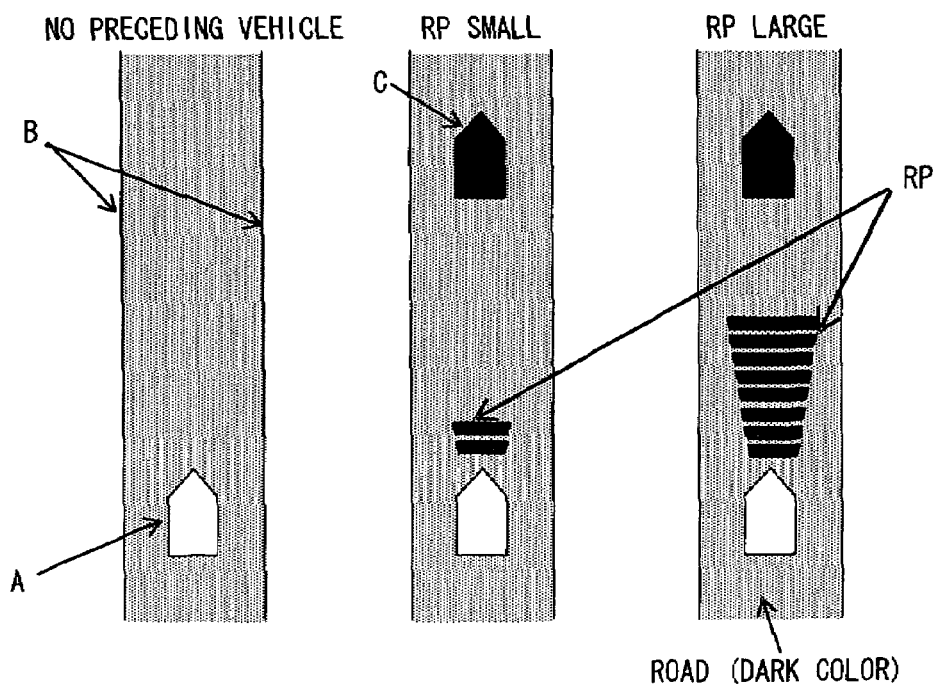

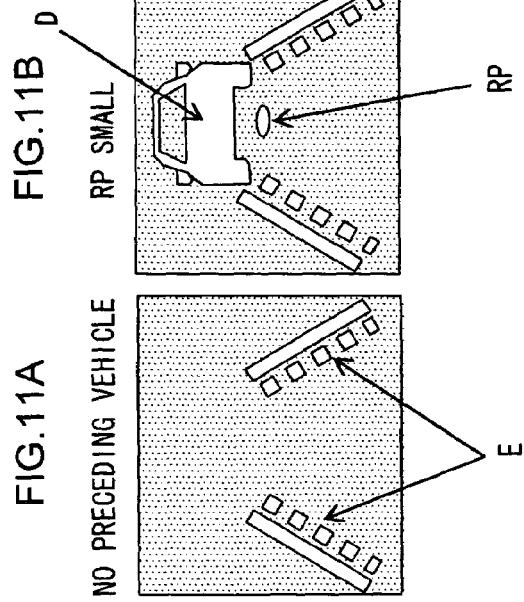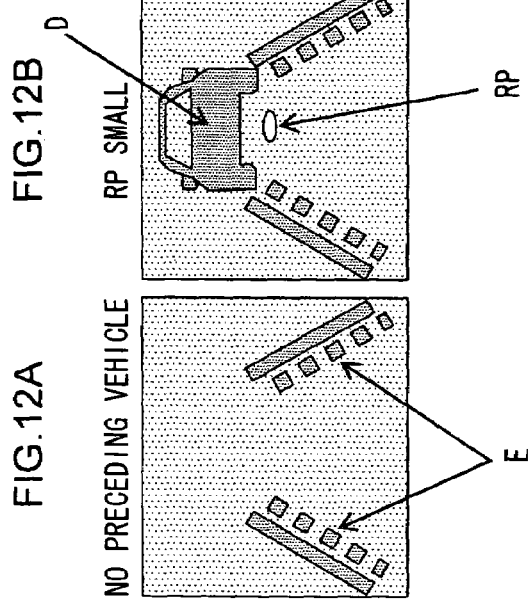

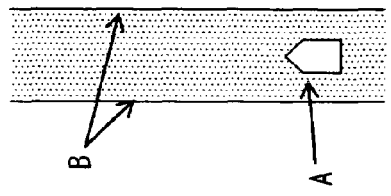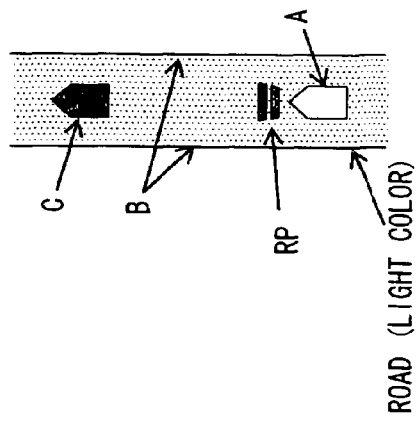
FIG.18C / FIG.18B / FIG.18A
FIG.19C / FIG.19B / FIG.19A
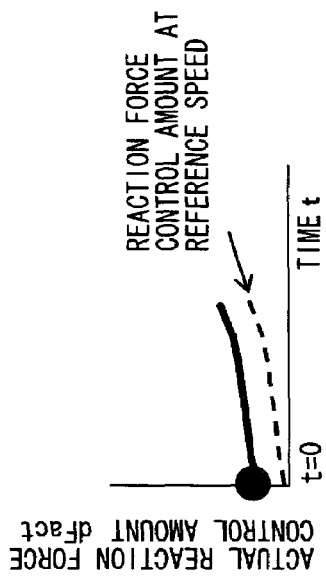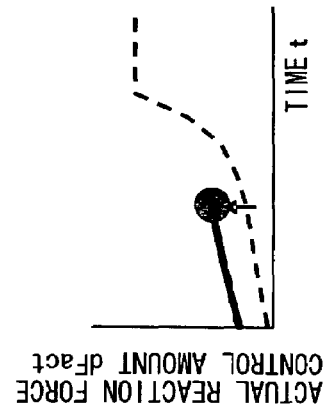
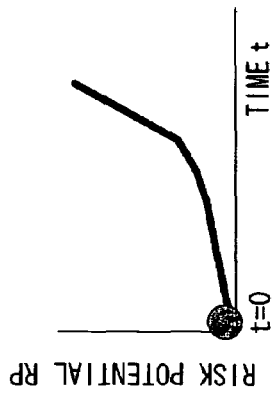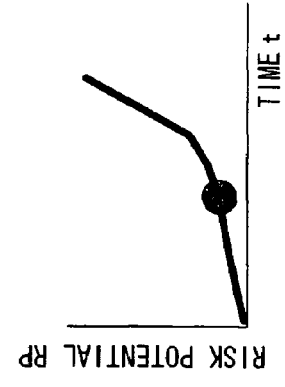

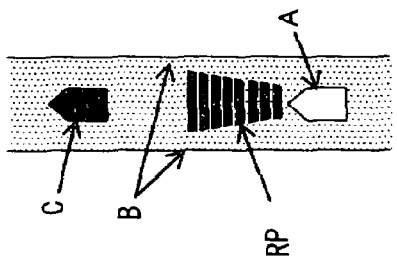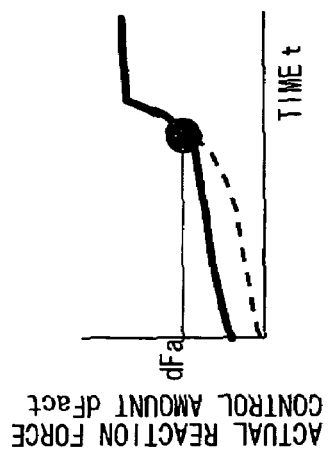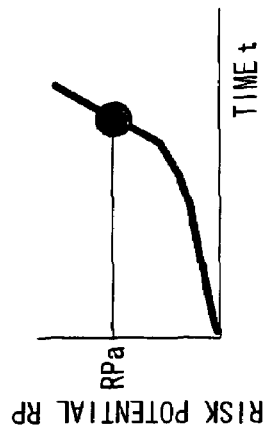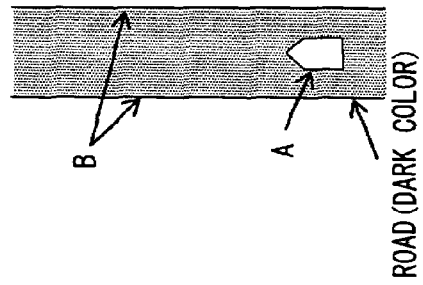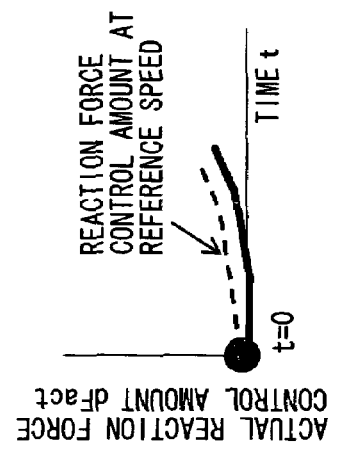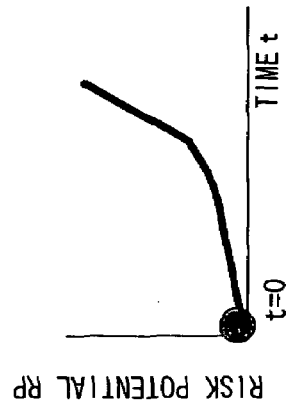

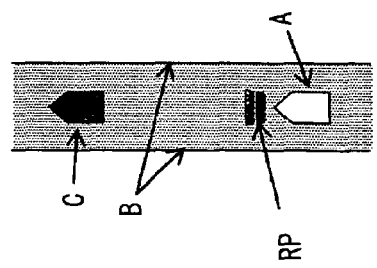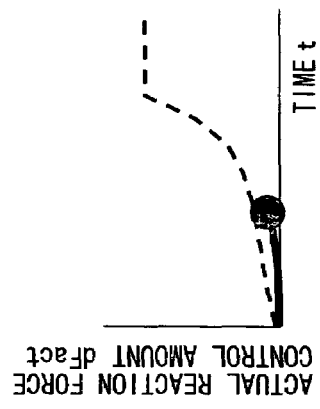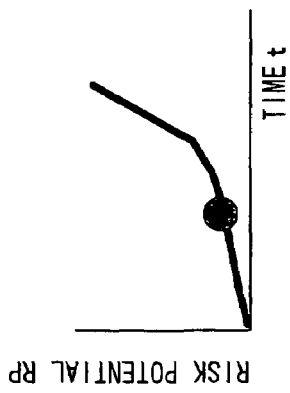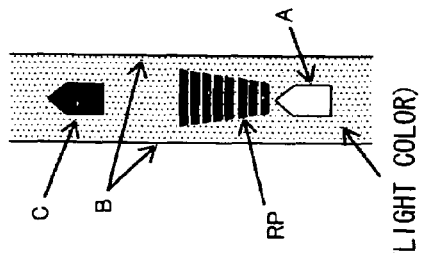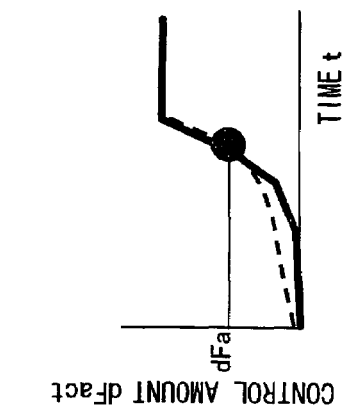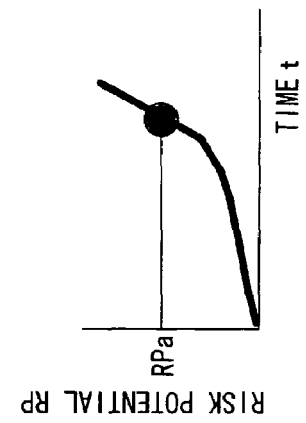

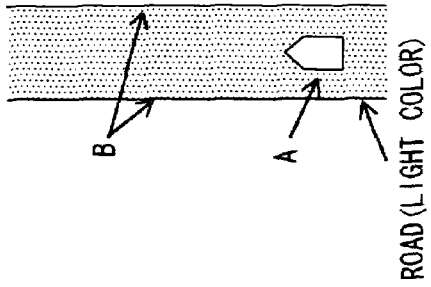
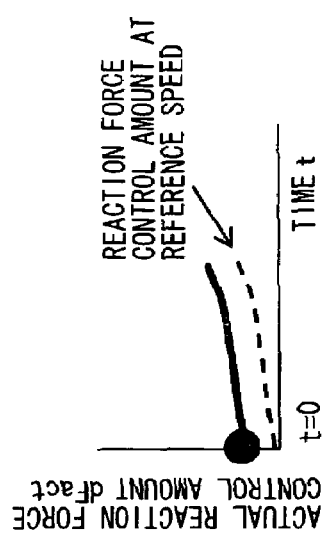
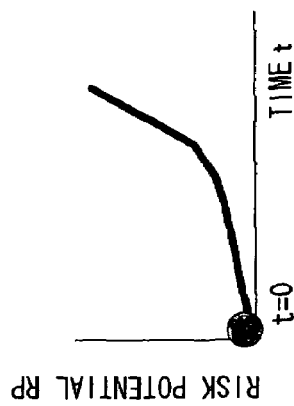
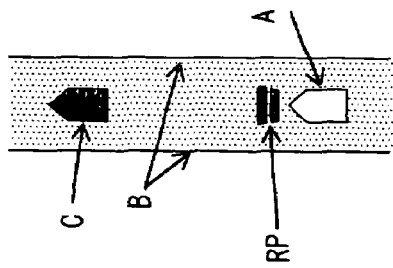
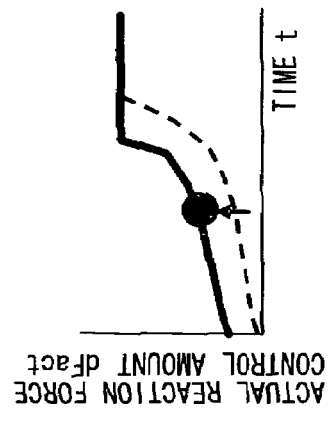
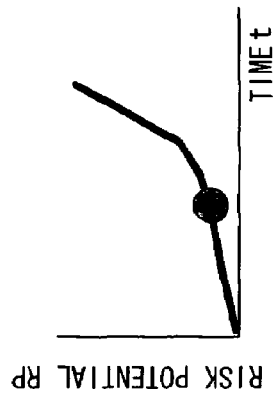

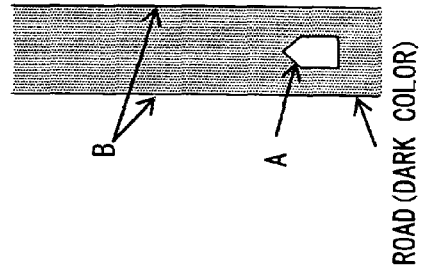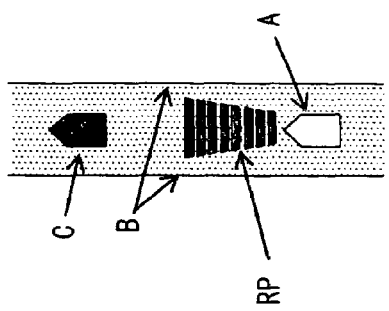
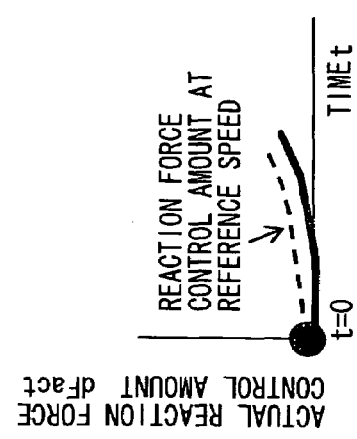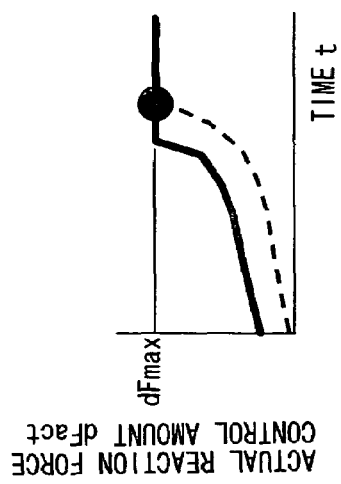
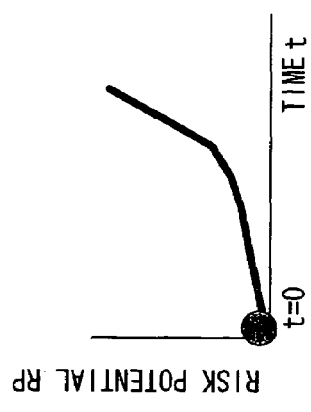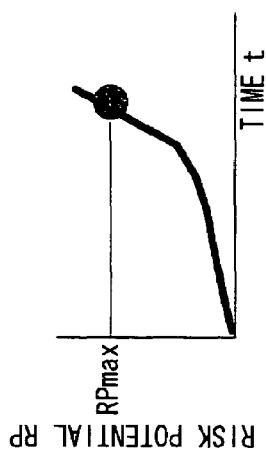

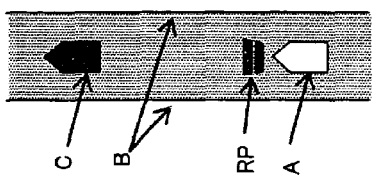
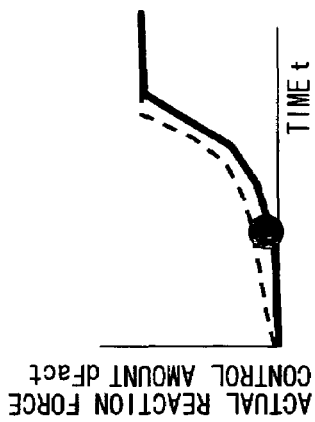
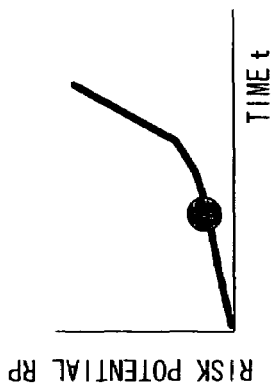
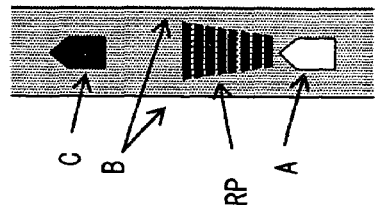
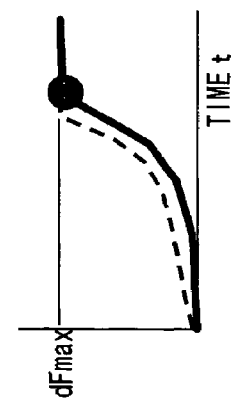
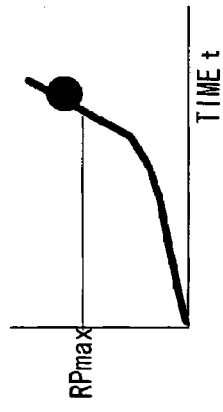

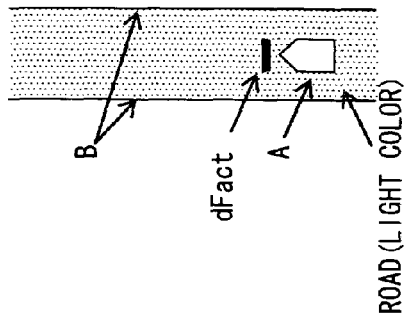
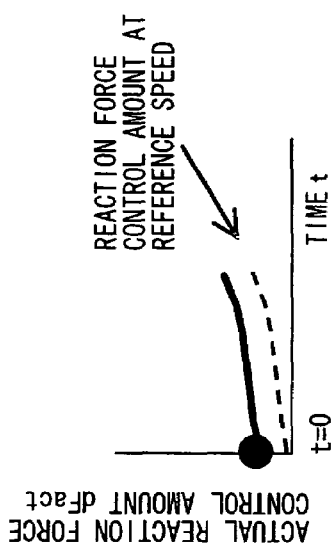
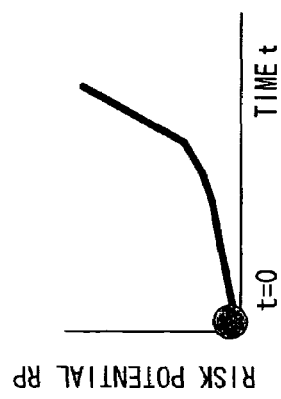
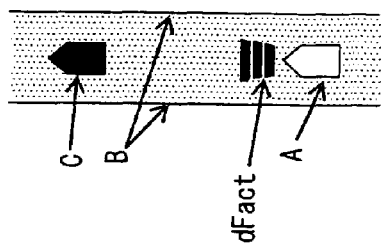
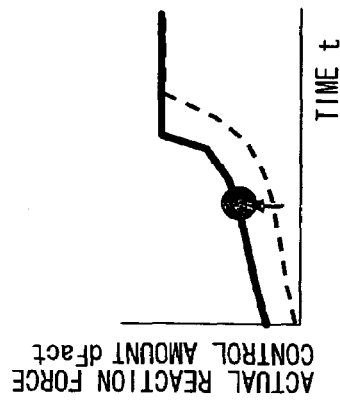
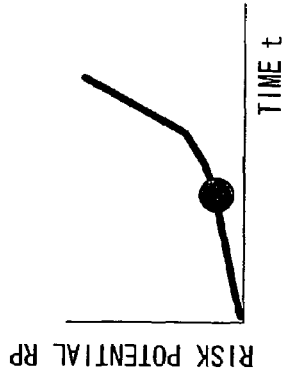

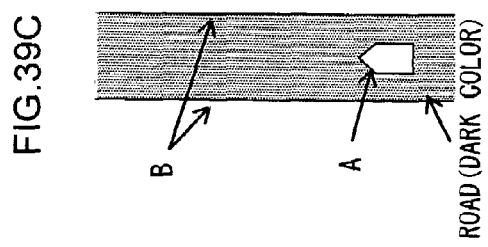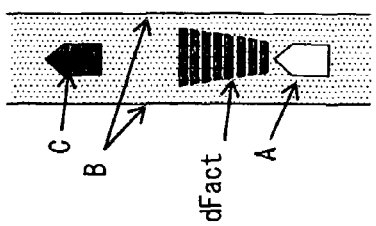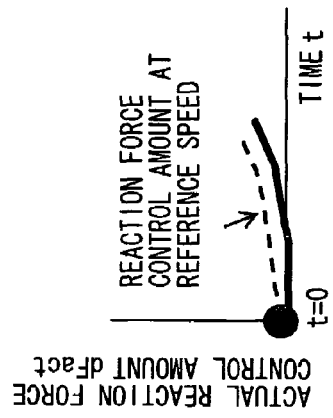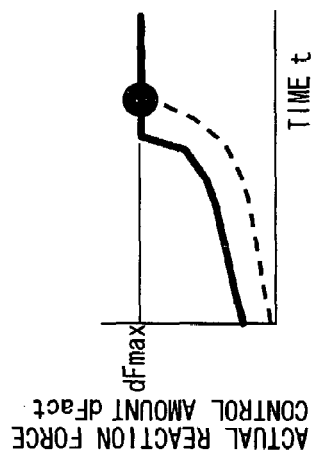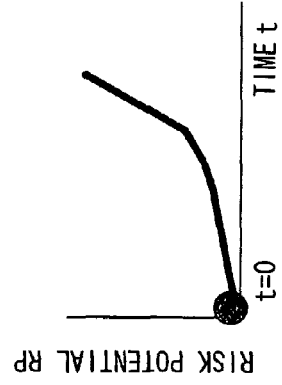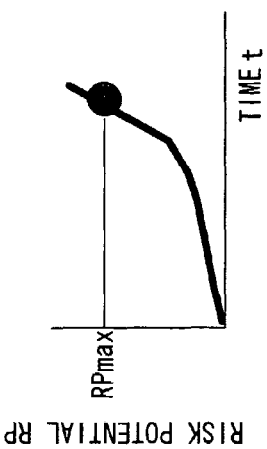

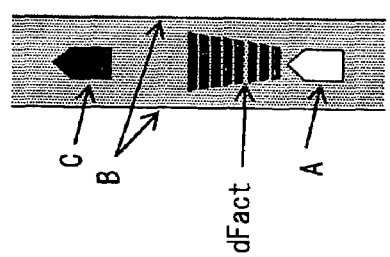
FIG.40A FIG.40B FIG.40C
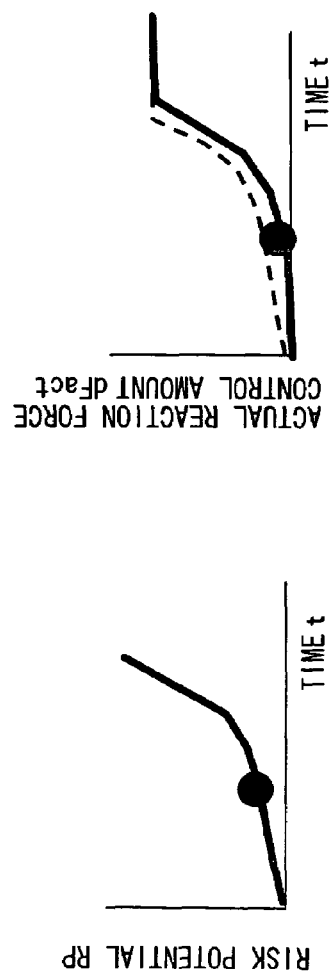
FIG.41A FIG.41B FIG.41C
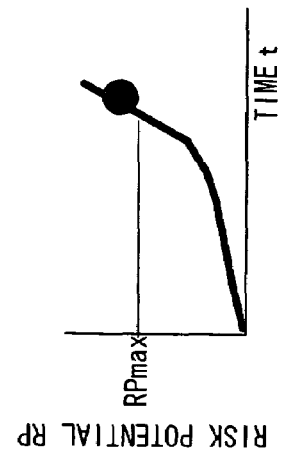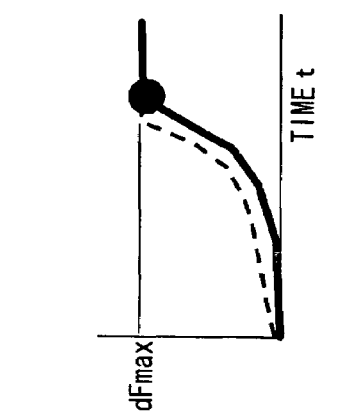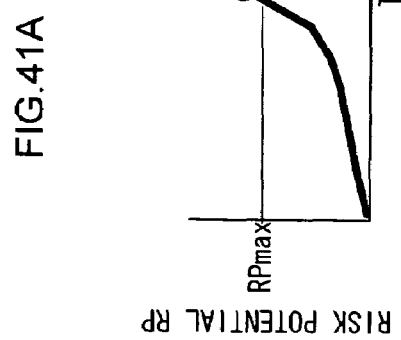

DRIVING ASSIST SYSTEM FOR VEHICLE

BACKGROUND OF THE INVENTION

1. Field of the Invention

The present invention relates to a drive operation assist device for a vehicle, for assisting operations carried out by a driver.

2. Description of Related Art

Systems that assist driver operations include the system disclosed in Japanese Patent Laid-open Publication No. H10-166889. This system changes operation reaction force of an accelerator pedal based on inter-vehicle distance between a preceding vehicle and a subject vehicle. Warning is given to a driver by increasing reaction force of the acceleration pedal as the distance between vehicles decreases. Japanese Patent Laid-open Publication No. H10-166890 and 2000-54860 also disclose systems that assist driver operations.

SUMMARY OF THE INVENTION

For this kind of driving assist system for vehicle, it is preferable to transmit to a driver information including not just a current inter-vehicle distance between a vehicle and a preceding vehicle, but also risk due to impending conditions.

A driving assist system for vehicle according to the present invention comprises a traveling environment detection device that detects traveling environment of vehicle surroundings; a risk potential calculating device that calculates a risk potential relating to a front-to-back direction of the vehicle based on detection results of the traveling environment detection device; a reference speed calculating device that calculates a reference speed to be a reference for the vehicle to travel; and a haptic information conveying device that conveys the risk potential calculated by the risk potential calculating device and information relating to the reference speed calculated by the reference speed calculating device to a driver via sense of touch.

A driving assist system for vehicle according to the present invention comprises a traveling environment detection device that detects traveling environment of vehicle surroundings; a risk potential calculating device that calculates a risk potential relating to a front-to-back direction of the vehicle based on detection results of the traveling environment detection device; a reference speed calculating device that calculates a reference speed to be a reference for the vehicle to travel; a haptic information conveying device that conveys the risk potential calculated by the risk potential calculating device to a driver via sense of touch; and a display device that displays information relating to the risk potential and information relating to the reference speed calculated by the reference speed calculating device.

A driving assist system for vehicle according to the present invention comprises a traveling environment detection device that detects traveling environment of vehicle surroundings; a current risk calculating device that calculates an extent of current risk to the vehicle based on detection results of the traveling environment detection device; an impending risk calculating device that estimates a level of impending risk relating to traveling of the vehicle; a haptic information conveying device that conveys the extent of current risk calculated by the current risk calculating device to a driver as haptic information; and a visual information conveying device that conveys the level of impending risk estimated by the impending risk calculating device to the driver as visual information.

A driving assist system for vehicle according to the present invention comprises a traveling environment detection means for detecting traveling environment of vehicle surroundings; a risk potential calculating means for calculating a risk potential relating to a front-to-back direction of the vehicle based on detection results of the traveling environment detection means; a reference speed calculating means for calculating a reference speed to be a reference for the vehicle to travel; and a haptic information conveying means for conveying the risk potential calculated by the risk potential calculating means and information relating to the reference speed calculated by the reference speed calculating means to a driver via sense of touch.

A driving assist system for vehicle according to the present invention comprises a traveling environment detection means for detecting traveling environment of vehicle surroundings; a current risk calculating means for calculating an extent of current risk to the vehicle based on detection results of the traveling environment detection means; an impending risk calculating means for estimating a level of impending risk relating to traveling of the vehicle; a haptic information conveying means for conveying the extent of current risk calculated by the current risk calculating means to a driver as haptic information; and a visual information conveying means for conveying the level of impending risk estimated by the impending risk calculating means to the driver as visual information.

In a vehicle driving assist method according to the present invention, traveling environment of vehicle surroundings is detected; a risk potential relating to a front-to-back direction of the vehicle is calculated based on the traveling environment thus detected; a reference speed to be a reference for the vehicle to travel is calculated; and the risk potential and information relating to the reference speed are conveyed to a driver via sense of touch.

In a vehicle driving assist method according to the present invention, traveling environment of vehicle surroundings is detected; an extent of current risk to the vehicle is calculated based on the traveling environment thus detected; a level of impending risk relating to traveling of the vehicle is estimated; the extent of current risk is conveyed to a driver as haptic information; and the level of impending risk is conveyed to the driver as visual information.

A vehicle according to the present invention comprises a driving assist system for vehicle that comprises (A) a traveling environment detection device that detects traveling environment of vehicle surroundings; (B) a risk potential calculating device that calculates a risk potential relating to a front-to-back direction of the vehicle based on detection results of the traveling environment detection device; (C) a reference speed calculating device that calculates a reference speed to be a reference for the vehicle to travel; and (D) a haptic information conveying device that conveys the risk potential calculated by the risk potential calculating device and information relating to the reference speed calculated by the reference speed calculating device to a driver via sense of touch.

A vehicle according to the present invention comprises a driving assist system for vehicle that comprises (A) a traveling environment detection device that detects traveling environment of vehicle surroundings; (B) a current risk calculating device that calculates an extent of current risk to the vehicle based on detection results of the traveling environment detection device; (C) an impending risk calculating device that estimates a level of impending risk relating to traveling of the vehicle; (D) a haptic information conveying device that conveys the extent of current risk calculated by the current risk calculating device to a driver as haptic information; and (E) a visual information conveying device that conveys the level of impending risk estimated by the impending risk calculating device to the driver as visual information.

BRIEF DESCRIPTION OF THE DRAWINGS

FIG. 6A to FIG. 6C show example displays of information relating to risk potential and reference speed in cases where vehicle speed is faster than the reference speed.

FIG. 7A to FIG. 7C show example displays of information relating to risk potential and reference speed in cases where vehicle speed is equal to or less than the reference speed.

FIG. 8A to FIG. 8C show other example displays of information relating to risk potential and reference speed in cases where vehicle speed is faster than the reference speed.

FIG. 9A to FIG. 9C show other example displays of information relating to risk potential and reference speed in cases where vehicle speed is equal to or less than the reference speed.

FIG. 11A to FIG. 11D show other example displays of information relating to risk potential and reference speed in cases where vehicle speed is faster than the reference speed.

FIG. 12A to FIG. 12D show other example displays of information relating to risk potential and reference speed in cases where vehicle speed is equal to or less than the reference speed.

FIG. 18A to FIG. 18C are views showing change in risk potential with time, change in actual reaction force control amount with time, and a display example of risk potential, respectively, for the case where vehicle speed is faster than a reference speed.

FIG. 19A to FIG. 19C are views showing change in risk potential with time, change in actual reaction force control amount with time, and a display example of risk potential, respectively, for the case where vehicle speed is faster than a reference speed.

FIG. 20A to FIG. 20C are views showing change in risk potential with time, change in actual reaction force control amount with time, and a display example of risk potential, respectively, for the case where vehicle speed is faster than a reference speed.

FIG. 21A to FIG. 21C are views showing change in risk potential with time, change in actual reaction force control amount with time, and a display example of risk potential, respectively, for the case where vehicle speed is slower than a reference speed.

FIG. 22A to FIG. 22C are views showing change in risk potential with time, change in actual reaction force control amount with time, and a display example of risk potential, respectively, for the case where vehicle speed is slower than a reference speed.

FIG. 23A to FIG. 23C are views showing change in risk potential with time, change in actual reaction force control amount with time, and a display example of risk potential, respectively, for the case where vehicle speed is slower than a reference speed.

FIG. 28A to FIG. 28C are views showing change in risk potential with time, change in actual reaction force control amount with time, and a display example of risk potential, respectively, for the case where vehicle speed is faster than a reference speed.

FIG. 29A to FIG. 29C are views showing change in risk potential with time, change in actual reaction force control amount with time, and a display example of risk potential, respectively, for the case where vehicle speed is faster than the reference speed.

FIG. 30A to FIG. 30C are views showing change in risk potential with time, change in actual reaction force control amount with time, and a display example of risk potential, respectively, for the case where vehicle speed is faster than a reference speed.

FIG. 31A to FIG. 31C are views showing change in risk potential with time, change in actual reaction force control amount with time, and a display example of risk potential, respectively, for the case where vehicle speed is slower than a reference speed.

FIG. 32A to FIG. 32C are views showing change in risk potential with time, change in actual reaction force control amount with time, and a display example of risk potential, respectively, for the case where vehicle speed is slower than a reference speed.

FIG. 33A to FIG. 33C are views showing change in risk potential with time, change in actual reaction force control amount with time, and a display example of risk potential, respectively, for the case where vehicle speed is slower than a reference speed.

FIG. 36A to FIG. 36C are views showing change in risk potential with time, change in actual reaction force control amount with time, and a display example of risk potential, respectively, for the case where vehicle speed is faster than a reference speed.

FIG. 37A to FIG. 37C are views showing change in risk potential with time, change in actual reaction force control amount with time, and a display example of risk potential, respectively, for the case where vehicle speed is faster than a reference speed.

FIG. 38A to FIG. 38C are views showing change in risk potential with time, change in actual reaction force control amount with time, and a display example of risk potential, respectively, for the case where vehicle speed is faster than a reference speed.

FIG. 39A to FIG. 39C are views showing change in risk potential with time, change in actual reaction force control amount with time, and a display example of risk potential, respectively, for the case where vehicle speed is slower than a reference speed.

FIG. 40A to FIG. 40C are views showing change in risk potential with time, change in actual reaction force control amount with time, and a display example of risk potential, respectively, for the case where vehicle speed is slower than a reference speed.

FIG. 41A to FIG. 41C are views showing change in risk potential with time, change in actual reaction force control amount with time, and a display example of risk potential, respectively, for the case where vehicle speed is slower than the reference speed.

DESCRIPTION OF THE PREFERRED EMBODIMENTS

First Embodiment

Figure 1:
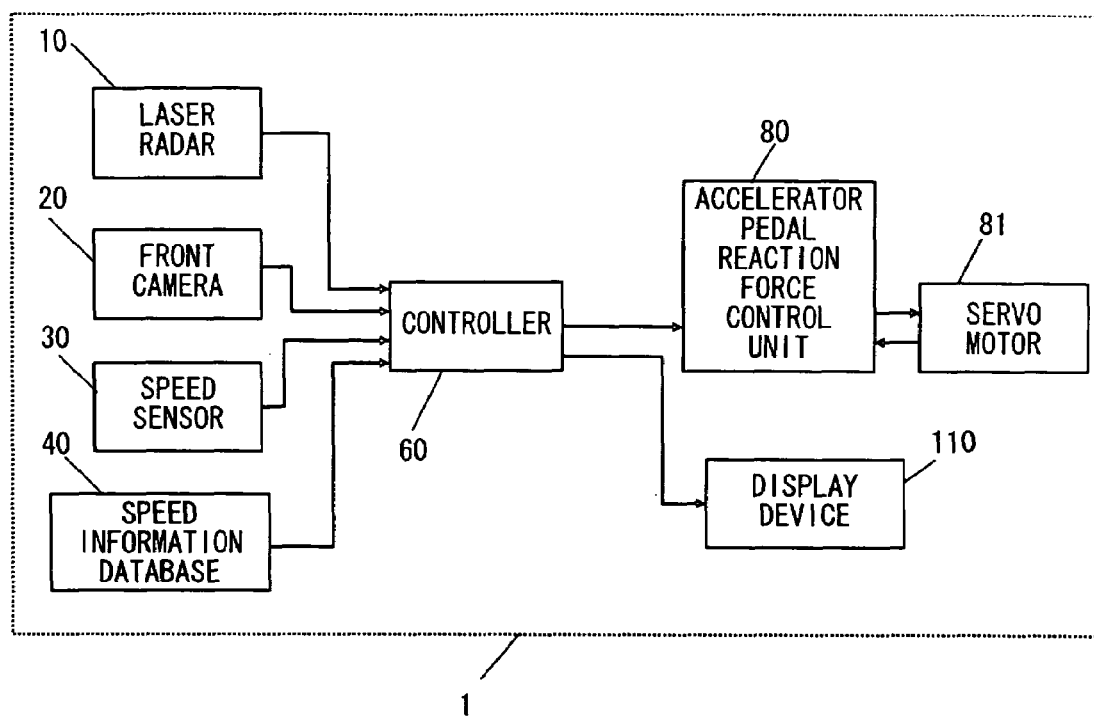
FIG. 1 is a system view of a driving assist system for vehicle of a first embodiment of the present invention.
Figure 2:
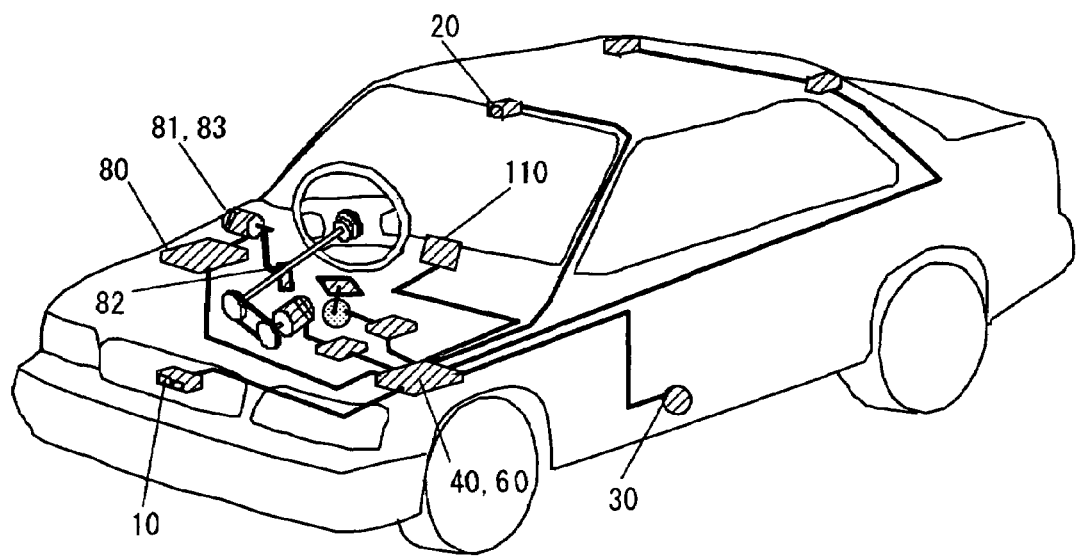
FIG. 2 is a structural drawing of a vehicle fitted with the driving assist system for vehicle shown in FIG. 1.

The following is a description using the drawings of a driving assist system for vehicle of a first embodiment of the present invention. FIG. 1 is a system drawing showing the structure of a driving assist system for vehicle 1 of the first embodiment of the present invention, and FIG. 2 is a structural drawing of a vehicle fitted with the driving assist system for vehicle 1.

First of all the structure of the driving assist system for vehicle 1 will be described. A laser radar 10 is attached to a front grill section of the vehicle or to a bumper etc., and irradiates infrared light pulses in a horizontal direction so as to scan the region ahead of the vehicle. The laser radar 10 measures reflected waves of infrared light pulses reflected by a plurality of reflecting objects ahead (normally the rear of a preceding vehicle), and detects a distance from the subject vehicle to the preceding vehicle and a direction in which the preceding vehicle is present relative to the subject vehicle based upon the time it takes reflected waves to be received. The detected distance between vehicles and direction of the preceding vehicle are output to a controller 60. In this embodiment, the direction in which a preceding vehicle exists can be expressed as a relative angle with respect to the vehicle. The forward region scanned by the laser radar 10 is about 6 degrees each side of an axis parallel to the vehicle longitudinal centerline. Objects existing within this range cab be detected.

A front camera 20, which is a small CCD camera or CMOS camera etc. fitted to an upper part of the front window, detects the conditions of the road ahead as an image and outputs the detected image to the controller 60. A detection region of the front camera 20 is about 30 degrees each side of the vehicle longitudinal centerline and an image included in this region is captured for the landscape of the road ahead.

A speed sensor 30 detects a traveling speed of the vehicle by measuring rotational speed of wheels or rotational speed of the output shaft of a transmission and outputs the detected vehicle speed to the controller 60. A speed information database 40 is a database pertaining to recommended speed information incorporated, for example, into a navigation system (not shown). The controller 60 acquires recommended speed information corresponding to a current position of the vehicle calculated from a GPS signal at, for example, the navigation system, from the speed information database 40.

Figure 3:
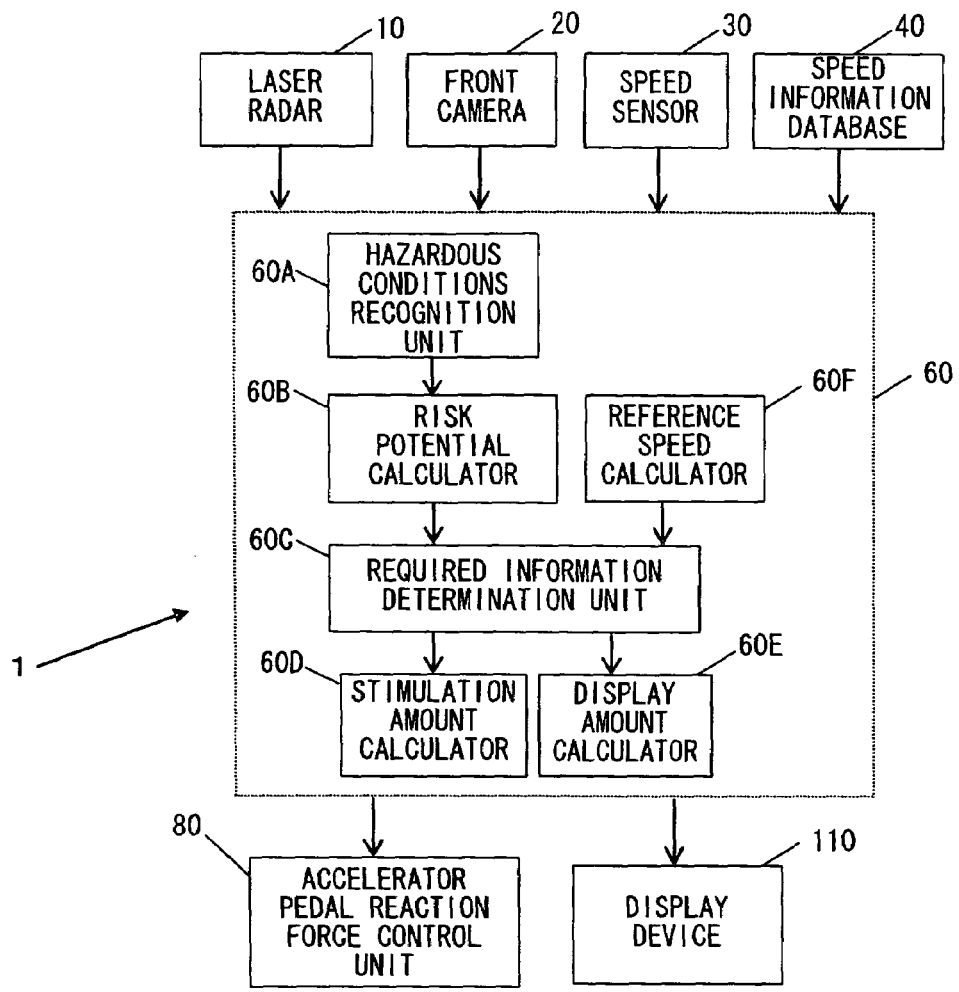
FIG. 3 is a block view showing the configuration of the inside and periphery of a controller.

The controller 60 comprises a CPU and CPU peripheral devices, such as ROM, RAM etc., and performs overall control of the driving assist system for vehicle 1. A block view showing the configuration of the inside and periphery of the controller 60 is shown in FIG. 3. The controller 60 may constitute an obstacle (or hazardous) conditions recognition unit 60A, risk potential calculator 60B, necessary information determination unit 60C, stimulation amount calculator 60D, display quantity calculator 60E, and reference speed calculator 60F by adopting a specific software mode at the CPU.

The controller 60 detects traveling environment of vehicle surroundings, i.e. obstacle conditions from vehicle speed inputted by the vehicle speed sensor 30, distance information inputted by the laser radar 10, and image information for vehicle surroundings inputted by the front camera 20. The controller 60 subjects image information from the front camera 20 to image processing and detects obstacle conditions (hazardous conditions) surrounding the vehicle. In this embodiment, the distance (inter-vehicle distance) to the preceding vehicle traveling to the front of the vehicle, the presence or absence of another vehicle traveling in an adjacent lane and proximity of another vehicle to the subject vehicle, a lateral position (relative position and angle) of the vehicle with respect to lane lines (lane markers) and guard rails, and the shape of lane markers and guard rails are detected as obstacle conditions.

The controller 60 calculates a risk potential of the vehicle with respect to each obstacle based on the detected obstacle conditions and controls accelerator pedal reaction force according to the risk potential as will be described later. In addition, the controller 60 sets the recommended speed for the road on which the vehicle is currently traveling and communicates information relating to risk potential and recommended speed to the driver as visual information. In this embodiment, the recommended speed is a value recommended as a vehicle speed taking into consideration the speed limit of the road the vehicle is traveling on, measurement error of the speed sensor 30, fuel consumption and the like is appropriately set in advance.

Figure 4:
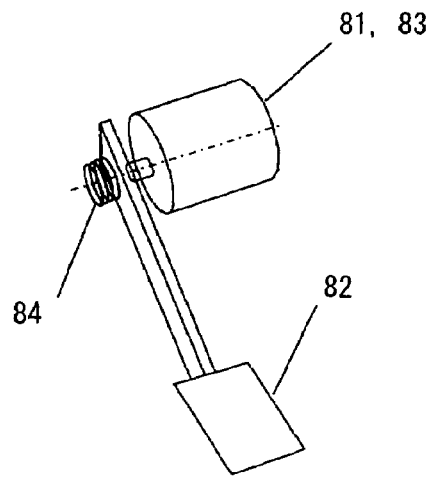
FIG. 4 is a view of an accelerator pedal and its surroundings.

As shown in FIG. 4, a servo motor 81 and an accelerator pedal stroke sensor 83 are incorporated at a link mechanism of an accelerator pedal 82. An accelerator pedal reaction force control device 80 is capable of controlling torque generated by a servo motor 81 according to instructions from the controller 60. The servo motor 81 controls reaction force to be generated according to an instruction value from the accelerator pedal reaction force control device 80 and thus force (operation reaction force) generated while a driver depresses the accelerator pedal 82 can be controlled as desired. The accelerator pedal stroke sensor 83 detects operation amount (depression amount) of the accelerator pedal 82 converted to rotation angle of the servo motor 81 via the link mechanism.

A normal accelerator pedal reaction force characteristic when control of accelerator pedal reaction force is not carried out are set so that, for example, reaction force of the accelerator pedal becomes larger in a linear manner as the accelerator pedal operation amount becomes larger. The normal accelerator pedal reaction force characteristic can be implemented, for example, using spring force of a torsion spring 84 provided at the center of rotation of the accelerator pedal 82.

A display device 110 is, for example, equipped with a liquid crystal monitor and is used to convey the driver information relating to the risk potential of vehicle surroundings and recommended speed calculated by the controller 60 as visual information displayed on the monitor.

The following is a description of the operation of the driving assist system for vehicle 1 of the first embodiment of the present invention.

The obstacle conditions recognition unit 60A of the controller 60 recognizes obstacle conditions surrounding the vehicle such as the traveling speed of the vehicle, relative position and direction of motion of other vehicles to the front of the vehicle or in adjacent lanes, and the relative position of the vehicle with respect to lane markers and guard rails. The risk potential calculator 60B obtains the risk potential of the vehicle with respect to each obstacle based on the obstacle conditions recognized by the obstacle conditions recognition unit 60A.

The reference speed calculator 60F calculates a reference speed taken as a reference when the vehicle is traveling based on the recommended speed for the road on which the vehicle is traveling.

The necessary information determination unit 60C determines information required for transmission to the driver based on the risk potential calculated by the risk potential calculator 60B, and the reference speed calculated by the reference speed calculator 60F i.e. information relating to the recommended speed. The necessary information determination unit 60C then, for example, compares the vehicle speed and the reference speed. The stimulation amount calculator 60D calculates a stimulation amount to be conveyed to the driver based on the risk potential. Here, the stimulation amount is a physical quantity for transmitting risk potential to the driver via sense of touch, and is specifically a reaction force control amount of the accelerator pedal 82. The reaction control force calculated by the stimulation amount calculator 60D is outputted to the accelerator pedal reaction force control device 80 as a reaction force instruction value. Accordingly, the accelerator pedal reaction force control device 80 performs accelerator pedal reaction force control according to the reaction force instruction value.

In this way, in a system where the risk potential calculated from the traveling environment of the vehicle surroundings is conveyed to a driver using, for example, accelerator pedal reaction force, since the accelerator pedal 82 is an operation equipment with which the driver makes direct contact to operate, it is possible to transmit the risk potential to the driver by stimulating the sense of touch of the driver via the accelerator pedal 82. Namely, it is possible for the driver to recognize information intuitively via sense of touch.

There are cases with this kind of system where it is preferable to provide additional visual information. For example, it is difficult for drivers that are not accustomed to systems for identifying risk potential using sense of touch to accurately discern the risk potential from the accelerator pedal reaction force. Further, when the risk potential is conveyed from the accelerator pedal reaction force, i.e. via sense of touch, there are cases where it is not possible to sufficiently transmit information due to sensitivity of sensory organs or individual differences with regards to the sense of touch of the driver, or differences between individuals due to physical conditions etc.

The risk potential of the vehicle surroundings is therefore conveyed to the driver via sense of touch as accelerator pedal reaction force, and is conveyed to the driver via sense of sight as a result of displaying the risk potential. Further, information relating to the risk potential and the speed recommended for the road the vehicle is traveling on is also displayed so that the impending risk to the vehicle can be conveyed to the driver as visual information.

Specifically, the display amount, i.e. the display content of the risk potential and the recommended speed information is decided at the display quantity calculator 60E of the controller 60. The display device 110 displays information in accordance with the display content decided in the display quantity calculator 60E so as to transmit the risk potential and recommended speed information to the driver as visual information.

Figure 5:
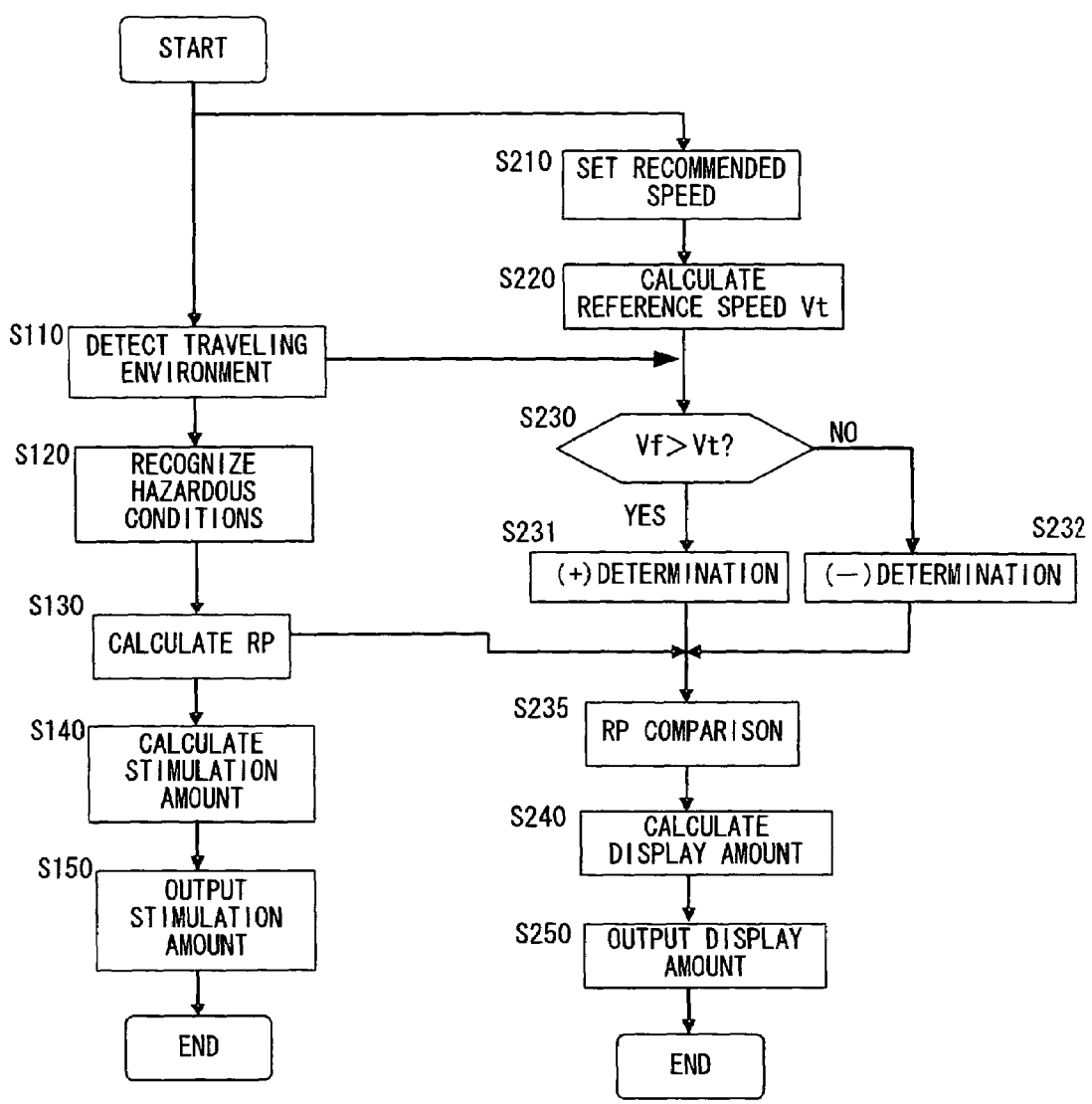
FIG. 5 is flow chart showing a processing sequence for a drive operation assist control program of the driving assist system for vehicle of the first embodiment.

The following is a detailed description using FIG. 5 of reaction force control and display control of a first embodiment. FIG. 5 is a flowchart showing a processing sequence for a drive operation assist control process of the controller 60 of the first embodiment. This processing is carried out continuously at fixed intervals of, for example, 50 msecs.

In step S110, the traveling environment for vehicle surroundings detected by the laser radar 10, front camera 20 and speed sensor 30 is read in. In step S120, the obstacle conditions recognition unit 60A recognizes the obstacle conditions (hazardous conditions) of the vehicle surroundings from the traveling environment read in in step S110. The obstacle conditions identified here are the relative distance D from the subject vehicle to an obstacle present in the vehicle surroundings, relative speed Vr to the object and vehicle speed Vf, etc.

In step S130, the risk potential calculator 60B calculates the risk potential RP of the vehicle surroundings based on the obstacle conditions recognized in step S120. In order to calculate the risk potential RP, first, time to contact (TTC) and time head way (THW) between the subject vehicle and an obstacle, for example, a preceding vehicle are calculated.

TTC is a physical quantity representing current degree of closeness of the vehicle to the preceding vehicle. In the case where current running conditions are continuous, that is, when vehicle speed Vf and relative velocity Vr are constant, TTC is a value representing how many seconds later the distance between vehicles D will become zero and the vehicle and the preceding vehicle come into contact with each other, and can be obtained from the following (Equation 1).

$$TTC = -D/Vr \qquad \text{(Equation 1)}$$

As the value of TTC becomes smaller, contact with the preceding vehicle is strained, which means that degree of closeness to the preceding vehicle is large. For example, when the subject vehicle is approaching the preceding vehicle, before TTC becomes four seconds or less it is known that almost all drivers will start a deceleration operation.

THW is a physical quantity representing predicted degree of influence on TTC due to variation in speed of a preceding vehicle assuming that the subject vehicle is following the preceding vehicle, namely degree of influence when it is assumed that the relative velocity Vr changes. THW is represented by the following (Equation 2).

$$THW = D/Vf \qquad \text{(Equation 2)}$$

THW is calculated by dividing the distance between vehicles D by the vehicle speed Vf, and represents a time until the vehicle reaches the current position of the preceding vehicle. As this THW becomes larger, the predicted degree of influence for changes in surrounding environment becomes smaller. That is, if THW is large, there is not a lot of influence on the degree of closeness to the preceding vehicle even if the preceding vehicle speed changes in the future, representing that TTC does not vary a great deal. When the vehicle follows the preceding vehicle at the vehicle speed equal to a preceding vehicle speed, THW may be calculated using the preceding vehicle speed in place of the vehicle speed Vf in (Equation 2).

Next, the risk potential RP with respect to the preceding vehicle is calculated using the TTC and the THW calculated as described above. The risk potential RP is calculated using (Equation 3) below.

$$RP=a/THW+b/TTC \quad \text{(Equation 3)}$$

Here, the constants a and b are parameters giving appropriate weightings to the THW and the TTC. The constants a and b are set appropriately in advance in such a manner that a<b (for example, a=1, b=8).

In step S140, the stimulation amount calculator 60D calculates a stimulation amount, i.e. an accelerator pedal reaction force control amount dF according to the risk potential RP calculated in step S130. The reaction force control amount dF is proportional to the risk potential RP, and can be calculated, for example, from the following (Equation 4).

$$dF=k1 \cdot RP \quad \text{(Equation 4)}$$

In (Equation 4), k1 is a constant, and is set in advance to an appropriate value.

Next, in step S150, the accelerator pedal reaction force control amount dF calculated in step S140 is output to the accelerator pedal reaction force control device 80. The accelerator pedal reaction force control device 80 controls accelerator pedal operation reaction force in response to the instruction value from the controller 60. Specifically, the acceleration pedal reaction force which corresponds to a value obtained by adding the reaction force control amount dF to the normal reaction force characteristic according to the acceleration pedal operation amount is generated. As a result, the risk potential RP of the vehicle surroundings is conveyed to the driver as haptic information.

Further, in step S210, the reference speed calculator 60F sets the speed Vt0 recommended for the road the vehicle is traveling on. The reference speed calculator 60F acquires a speed limit for the road the vehicle is traveling on from the speed information database 40 in accordance with information relating to the current position of the vehicle detected at, for example, the navigation system, and sets the recommended speed Vt0 taking into consideration the difference between the speed limit and the measurement error of the vehicle sensor 30 and fuel efficiency etc. The recommended speed Vt0 may be stored in a database in such a manner as to be correlated with the road type or speed limits and it is then possible to acquire the recommended speed Vt0 from the database.

In step S220, a reference speed Vt is calculated using the recommended speed Vt0 for the road the vehicle is traveling on acquired in step S210. The reference speed Vt is calculated using (Equation 5) below.

$$Vt=Vt0+\alpha \quad \text{(Equation 5)}$$

In (Equation 5), $\alpha$ is a prescribed value for setting the reference speed Vt of the vehicle with respect to the recommended speed Vt0. For example, as measurement error typically occurs at the speed sensor 30, a prescribed value $\alpha$ is set in advance in order to calculate the reference speed Vt based on the recommended speed Vt0 taking into consideration of the measurement error. Namely, as shown in (Equation 5), the reference speed Vt to be taken as a reference while the vehicle is traveling is calculated as a value obtained by adding to the recommended speed Vt0 the prescribed value $\alpha$ taking into consideration of, for instance, the measurement error of the speed sensor 30. This reference speed Vt is an index for estimating impending risk the vehicle may be subjected to, in other words, risk to the subject vehicle which may arise in the future. For example, when the vehicle is traveling at a speed faster than the reference speed Vt it is predicted that the risk will become gradually greater.

In step S230, the necessary information determination unit 60C compares the current vehicle speed Vf detected in step S110 and the reference speed Vt calculated in step S220. When the vehicle speed Vf is faster than the reference speed Vt, step S231 is proceeded to. In step S231, a (+) is determined with regards to the background color at the display monitor of the display device 110. Namely, it is determined to display the road the vehicle is traveling on using a light color at the display monitor. On the other hand, when the vehicle speed Vf is equal to or less than the reference speed Vt, step S232 is proceeded to, and (−) is determined with regards to the background color at the display monitor. Namely, it is determined to display the road the vehicle is traveling on using a dark color at the display monitor.

In step S235, the risk potential RP calculated in step S130 is compared with a prescribed value RPa and the background color at the display monitor is decided. Specifically, when (+) is determined in step S231, it is decided to display the background using a light color regardless of the level of the risk potential RP. On the other hand, when (−) is determined in step S232, if the risk potential RP is smaller than the prescribed value RPa, the background is displayed using a dark color, whereas when the risk potential RP is greater than or equal to the prescribed value RPa, it is decided that the background is displayed in a light color. It is to be noted that a contrast between a light color and a dark color of the background depends on the relative brightness and hue between the risk potential RP and the preceding vehicle displayed at the display monitor as described later.

In step S240, the display quantity calculator 60E decides upon the display amount, i.e. the display content of the risk potential RP displayed at the display device 110 based on the risk potential RP calculated in step S130 and the background color decided in step S235. The display content of the risk potential RP decided here will be described later.

In step S250, the display amount calculated in step S240 is outputted to the display device 110. The display device 110 displays display content corresponding to instructions from the controller 60 at the display monitor, and transmits the risk potential RP to the driver together with information relating to the reference speed Vt as visual information. This terminates the processing for this time.

Display examples of the risk potential RP on the display device 110 are shown in FIG. 6A to FIG. 6C and FIG. 7A to FIG. 7C. FIG. 6A to FIG. 6C show display examples for the case where the vehicle speed Vf is faster than the reference speed Vt, and FIG. 7A to FIG. 7C show display examples for the case where the vehicle speed Vf is equal to or less than the reference speed Vt.

As shown in FIG. 6A and FIG. 7A, when a preceding vehicle is not detected by sensors such as the laser radar 10 etc., a subject vehicle A is displayed at the lower part of the display monitor between lines B representing the lane markers of the vehicle lane. The vehicle A is represented, for example, by a pentagon. In this case, nothing is displayed to the front of the vehicle A, i.e. an upper portion of the display monitor, and it indicates that there is no preceding vehicle.

As shown in FIG. 6B, FIG. 6C, FIG. 7B and FIG. 7C, when a preceding vehicle is detected, a preceding vehicle C is lit up to the front of the vehicle, i.e. at the upper part of the display monitor so as to be displayed on the display monitor together with the vehicle A. The preceding vehicle C is shown, for example, as a pentagon, as with the vehicle A. A space between the vehicle A and the preceding vehicle C is taken as a display area for the risk potential RP and the risk potential RP is displayed in stages using indicator bars. Specifically, the magnitude of the risk potential RP is expressed by the number of indicator bars, with the number of indicator bars being made to increase as the risk potential RP increases. Further, the risk potential RP as a whole can be expressed as a trapezoid a width of which becomes broader upon becoming further away from the vehicle A. The width of the indicator bars on the side of the preceding vehicle C becomes larger as the risk potential RP becomes larger, and the height of the whole of the display for the risk potential RP becomes larger.

When the vehicle speed Vf is faster than the reference speed Vt, the background, i.e. the road between the lane markers B, is displayed using a light color in order to increase the visibility of the displaying of the preceding vehicle C and the risk potential RP. Namely, the brightness or hue of the background color is lowered with respect to the display colors for the preceding vehicle C and the risk potential RP so that the contrast between the preceding vehicle C and risk potential RP and the background color is made large. As a result, displaying of the preceding vehicle C and the risk potential RP is made to stand out.

Further, it is preferable that the colors of the vehicle A and the preceding vehicle C are different from each other so as to be changed to enable the vehicle A and the preceding vehicle C to be easily distinguished on the display monitor. For example, the preceding vehicle C is displayed using a darker color than that of the vehicle A, i.e. is displayed using a color of high visibility that stands out, and the risk potential RP is displayed using the same color as for the preceding vehicle C.

On the other hand, when the vehicle speed Vf is less than the reference speed Vt, as shown in FIG. 7A and FIG. 7B, the brightness or hue of the background color between the lane markers B is increased. Namely, the background is displayed using a dark color, and the contrast between the displaying of the preceding vehicle C and risk potential RP and the background color is small compared with the case where the vehicle speed Vf is faster than the reference speed Vt. However, when the risk potential RP is greater than the prescribed value RPa, the background color is made lighter as shown in FIG. 7C, and the contrast between the road and the preceding vehicle C and risk potential RP is made large so that the driver can easily understand that the risk potential RP is large.

In FIG. 6A to FIG. 6C and FIG. 7A to FIG. 7C, when the preceding vehicle is detected, the display position of the preceding vehicle on the display monitor can be changed according to the inter-vehicle distance between the subject vehicle to the preceding vehicle.

In the first embodiment described above, the following operational effects can be achieved.

(1) The driving assist system for vehicle 1 transmits the risk potential RP relating to a direction to the front and rear of the vehicle to the driver through sense of touch using accelerator pedal reaction force, and also displays information relating to the risk potential RP and the reference speed Vt on the display device 110. By displaying the risk potential RP, it is possible to assist the driver to understand the risk potential with ease while transmitting the risk potential to the driver through sense of touch. In particular, for drivers that are unaccustomed to systems that transmits the risk potential by sense of touch, the time to accustom to the system can be shortened. In addition, it is possible to assist drivers that are already accustomed to such systems to identify the risk potential in a straightforward manner when operation of the system starts. Further, by displaying information relating to the reference speed Vt for the road on which the vehicle is traveling together with the risk potential RP, it is possible for the driver to intuitively recognize impending risk to the vehicle.

(2) The necessary information determination unit 60C of the controller 60 determines information to be displayed at the display device 110 so as to be conveyed to the driver from the risk potential RP and the reference speed Vt. The display quantity calculator 60E sets content to be displayed at the display device 110 according to determination results at the necessary information determination unit 60C. Specifically, the necessary information determination unit 60C compares the vehicle speed Vf and the reference speed Vt. In the first embodiment, as shown in FIG. 6A to FIG. 6C and FIG. 7A to FIG. 7C, background color displayed at the display device 110 is changed according to results of comparing the vehicle speed Vf and the reference speed Vt. For example, when the vehicle is traveling at a speed faster than the reference speed Vt it is predicted that the risk will increase in future. Accordingly, as shown in FIG. 6A to FIG. 6C, the contrast between the background and the preceding vehicle C and risk potential RP displayed on the display device 110 is made large so that the driver can realize the magnitude of the risk intuitively. On the other hand, when the vehicle speed Vf is slower than the reference speed Vt, as shown in FIG. 7A and FIG. 7B, the contrast between the background and the preceding vehicle and risk potential is set to be small. However, at the necessary information determination unit 60C, the risk potential RP is compared with the prescribed value RPa, and when the risk potential RP is greater than the prescribed value RPa, the contrast between the background and the risk potential RP is set to be substantial. As a result, it is possible to notify the driver that the risk potential is substantial in a straightforward manner. By expressing information relating to the reference speed Vt as background colors on a display screen, it is possible to intuitively notify the driver as to whether the vehicle speed Vf is slower or faster than the reference speed Vt, and of changes in the impending risk to the vehicle.

Modified Example of the First Embodiment

In the first embodiment described above, the color in which the road is displayed at the display monitor is decided based on the reference speed Vt and the risk potential RP of the vehicle. Here, a description is given of an example of deciding display color of the road based on only the reference speed Vt.

Example displays of the risk potential RP according to the modified example of the first embodiment are shown in FIG. 8A to FIG. 8C and FIG. 9A to FIG. 9C. As with the first embodiment described above, when a preceding vehicle is not detected, only the vehicle A is displayed between the lane markers B. When the preceding vehicle is detected, the preceding vehicle C is displayed at the front of the vehicle A, i.e. at the upper part of the display monitor. In addition, a space between the vehicle A and the preceding vehicle C is taken as a display area for the risk potential RP and the risk potential is displayed in stages using indicator bars. When the vehicle speed Vf is faster than the reference speed Vt, as shown in FIG. 8A to FIG. 8C, the background between the lane markers B is shown in a light color so that the contrast between the colors for displaying the preceding vehicle C and risk potential RP and the background color is substantial.

On the other hand, when the vehicle speed Vf is equal to or less than the reference speed Vt, as shown in FIG. 9A to FIG. 9C, the background between the lane markers B is shown in a darker color so that the contrast of the colors for displaying the preceding vehicle C and risk potential RP and the background color becomes small compared with the case where the vehicle speed Vf is faster than the reference speed Vt.

Figure 10:
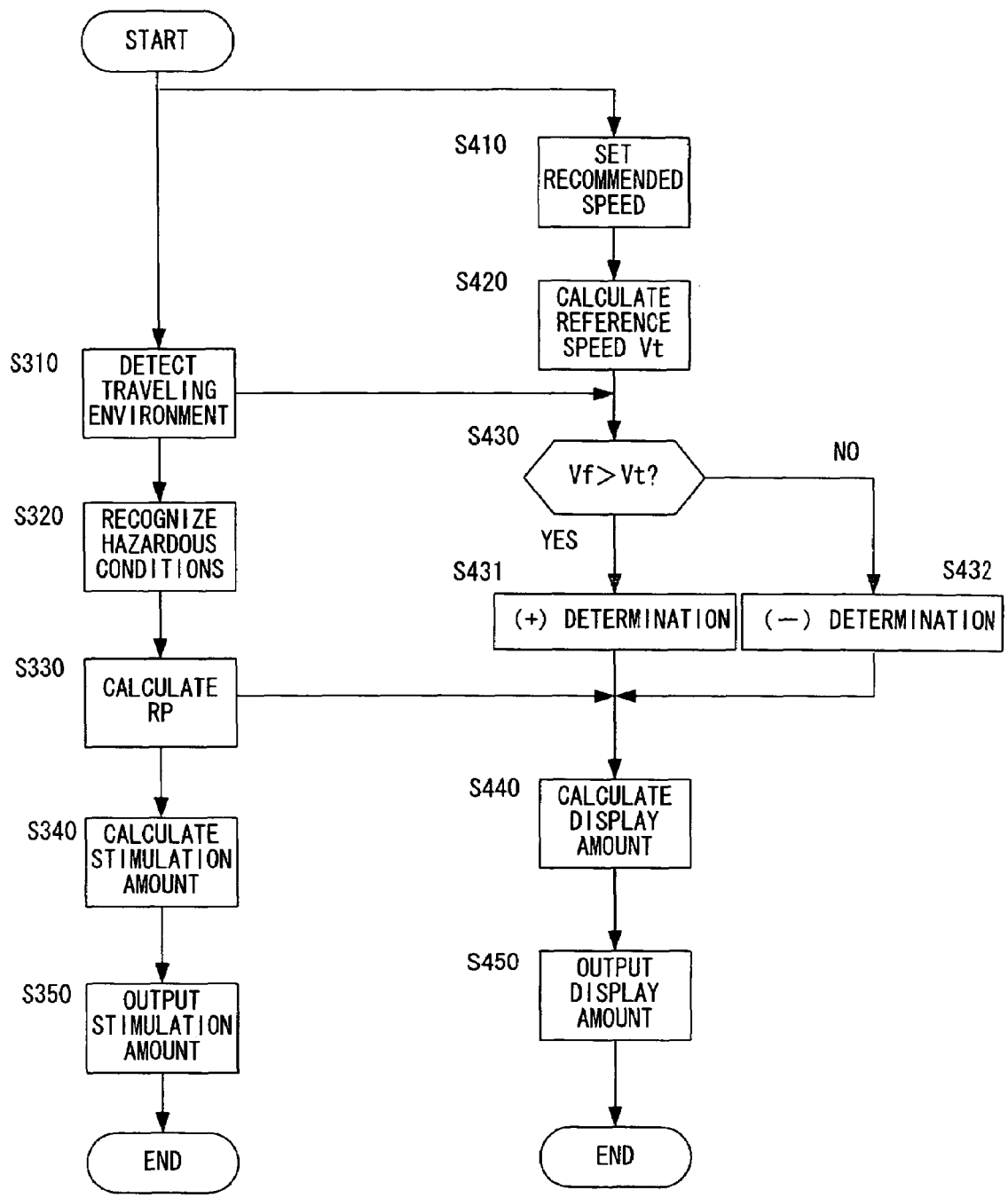
FIG. 10 is a flow chart showing a processing sequence for a drive operation assist control program of a modified example of the first embodiment.

FIG. 10 is a flow chart showing a processing sequence for a drive operation assist control process of the modified example of the first embodiment. This processing is carried out continuously at fixed intervals of, for example, 50 msecs.

The processing in step S310 to step S350 and step S410 to step S432 is the same as the processing in step S110 to step S150 and step S210 to step S232 shown in the flowchart in FIG. 5.

In step S440, the display content of the risk potential RP to be displayed at the display device 110 is decided. Specifically, the background color, i.e. the display color of the road, is decided in accordance with determination results for the background color determined in step S431 to step S432 according to the results of comparing the vehicle speed Vf and the reference speed Vt. Further, the number of indicator bars displayed as the risk potential RP is decided based on the risk potential RP calculated in step S330.

In step S450, the display amount decided in step S440 is outputted to the display device 110. Images are put up at the display device 110 as shown in FIG. 8A to FIG. 8C and FIG. 9A to FIG. 9C according to the risk potential RP and the reference speed Vt.

In the modified example of the first embodiment described above, as with the first embodiment described above, the risk potential RP is conveyed to the driver as accelerator pedal reaction force, and information relating to the risk potential RP and the reference speed Vt is conveyed as visual information displayed at the display device 110. Specifically, as shown in FIG. 8A to FIG. 8C, when the vehicle speed Vf is faster than the reference speed Vt, it is possible for an increase in impending risk to be intuitively conveyed to the driver by making the contrast between the background and the preceding vehicle C and risk potential RP substantial.

Other example displays of modified examples of the first embodiment are shown in FIG. 11A to FIG. 11D and FIG. 12A to FIG. 12D. FIG. 11A to FIG. 11D and FIG. 12A to FIG. 12D show example displays of the risk potential RP and the preceding vehicle in cases where the respective vehicle speeds Vf are faster than the reference speed Vt and in cases where the vehicle speed Vf is equal to or less than the reference speed Vt. Here, a preceding vehicle is displayed as viewed from the rear. At this time, lines E representing the lane markers of the vehicle lane are displayed and a preceding vehicle D is displayed above the lane markers E. The lane markers are spaced in such a manner as to become closer to each other as the preceding vehicle D becomes closer, i.e. towards the upper part of the display monitor, in order to give a perception of depth.

When a preceding vehicle is not detected by sensors, as shown in FIG. 11A and FIG. 12A, a preceding vehicle D is not displayed, and only lane markers E are displayed. When a preceding vehicle is then detected, as shown in FIG. 11B to FIG. 11D, and FIG. 12B to FIG. 12D, a preceding vehicle D is displayed. In this display example, the color of the road and the background at the display monitor is, for example, fixed to be black without being changed, and the colors of the preceding vehicle D and the lane markers E are changed according to the results of comparing the vehicle speed Vf and the reference speed Vt.

As shown in FIG. 11A to FIG. 11D, when the vehicle speed Vf is faster than the reference speed Vt, the hue of the preceding vehicle D and the lane markers E is lowered with respect to the background color, alternatively brightness is increased. Namely, the contrast between the colors for displaying the preceding vehicle D and the lane markers E and the background color is made large, and the preceding vehicle D and lane markers E are made to stand out. Further, when a preceding vehicle is present, the risk potential RP with respect to the preceding vehicle is displayed below the preceding vehicle D on the display monitor between the lane markers E. The magnitude of the risk potential RP is expressed by the number of elliptical risk potential marks (RP marks) displayed, with the number of RP marks that are lit up increasing and the RP marks themselves becoming larger as the risk potential RP increases.

For example, when the risk potential RP is small, as shown in FIG. 11B, a single elliptical RP mark is displayed directly below the preceding vehicle D. When the risk potential RP is medium, as shown in FIG. 11C, the number of RP marks displayed increases going in a downward direction from the preceding vehicle D. At this time, the width of the RP marks that are lit up becomes larger further down from the preceding vehicle D. Further, when the risk potential RP becomes large, as shown in FIG. 11D, the number of RP marks that are lit up increases further, and the width of the RP marks becomes still larger. Namely, the risk potential RP as a whole is displayed as a pyramid-shape of a width that becomes broader further away from the preceding vehicle D. The illumination area of the RP mark expands as the risk potential RP becomes larger, and is displayed so as to be close to a virtual vehicle position at the lower part of the display monitor.

On the other hand, as shown in FIG. 12A to FIG. 12D, in the case where the vehicle speed Vf is equal to or less than the reference speed Vt, the contrast of the colors for displaying the preceding vehicle D and lane markers E and the background color is smaller compared to the case where the vehicle speed Vf is faster than the reference speed Vt. It is to be noted when the vehicle speed Vf is equal to or less than the reference speed Vt, the RP marks to be lit up are changed according to the risk potential of the vehicle surroundings.

When the vehicle speed Vf is faster than the reference speed Vt, it is possible to intuitively make the driver aware of an increase in impending risk together with the current risk potential RP by displaying the risk potential RP of the vehicle and increasing the contrast of the preceding vehicle D and lane markers E and the background.

Second Embodiment

Figure 13:
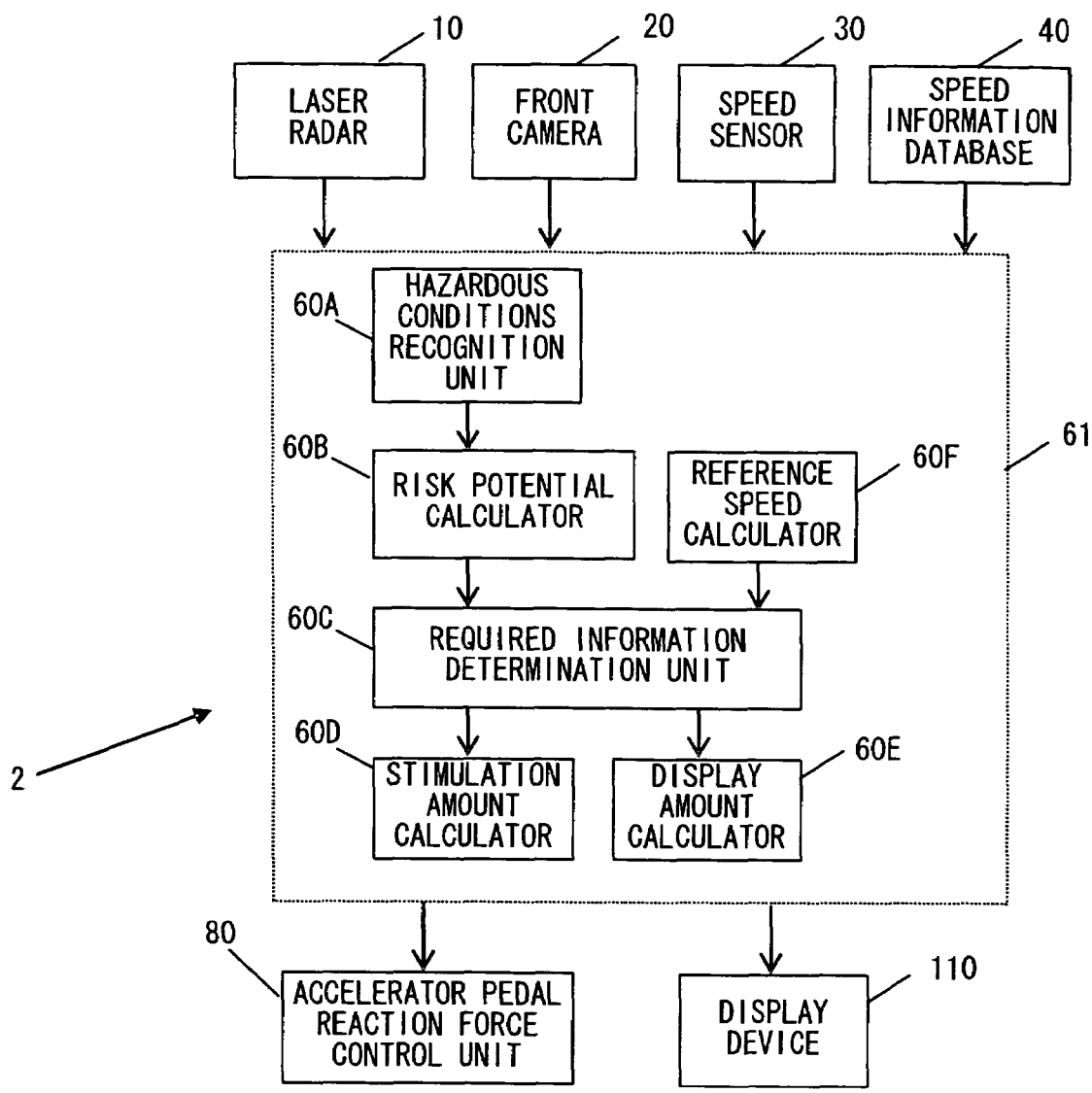
FIG. 13 is a block view showing the configuration of the inside and periphery of a controller in a second embodiment.

The following is a description of a driving assist system for vehicle of a second embodiment of the present invention. FIG. 13 shows a configuration of a driving assist system for vehicle 2 of the second embodiment and particularly shows a block view of the configuration of the inside of and surroundings of a controller 61. In FIG. 13, parts having the same function as in the first embodiment shown in FIG. 3 are given the same numerals. Description here will mainly focus on points of difference from the first embodiment.

In the second embodiment, as in the first embodiment, the risk potential RP is calculated based on the traveling environment of the vehicle surroundings and the risk potential RP and information relating to the recommended speed Vt0 of the road the vehicle is traveling on is displayed as visual information at the display monitor 110. Further, control of accelerator pedal reaction force is carried out according to the risk potential RP. At this time, information relating to the recommended speed Vt0 is also conveyed to the driver via sense of touch, i.e. as accelerator pedal reaction force.

Specifically, when the risk potential RP is smaller than the prescribed value RPa, an acceleration pedal reaction force control amount dF is corrected based on a difference (Vf−Vt) between the vehicle speed Vf and the reference speed Vt. When the risk potential RP is equal to or greater than the prescribed value RPa, the reaction force control amount dF is not corrected using the reference speed Vt. The following is a detailed description using the flowchart of FIG. 14 of the operation of a driving assist system for vehicle 2 of the second embodiment.

Figure 14:
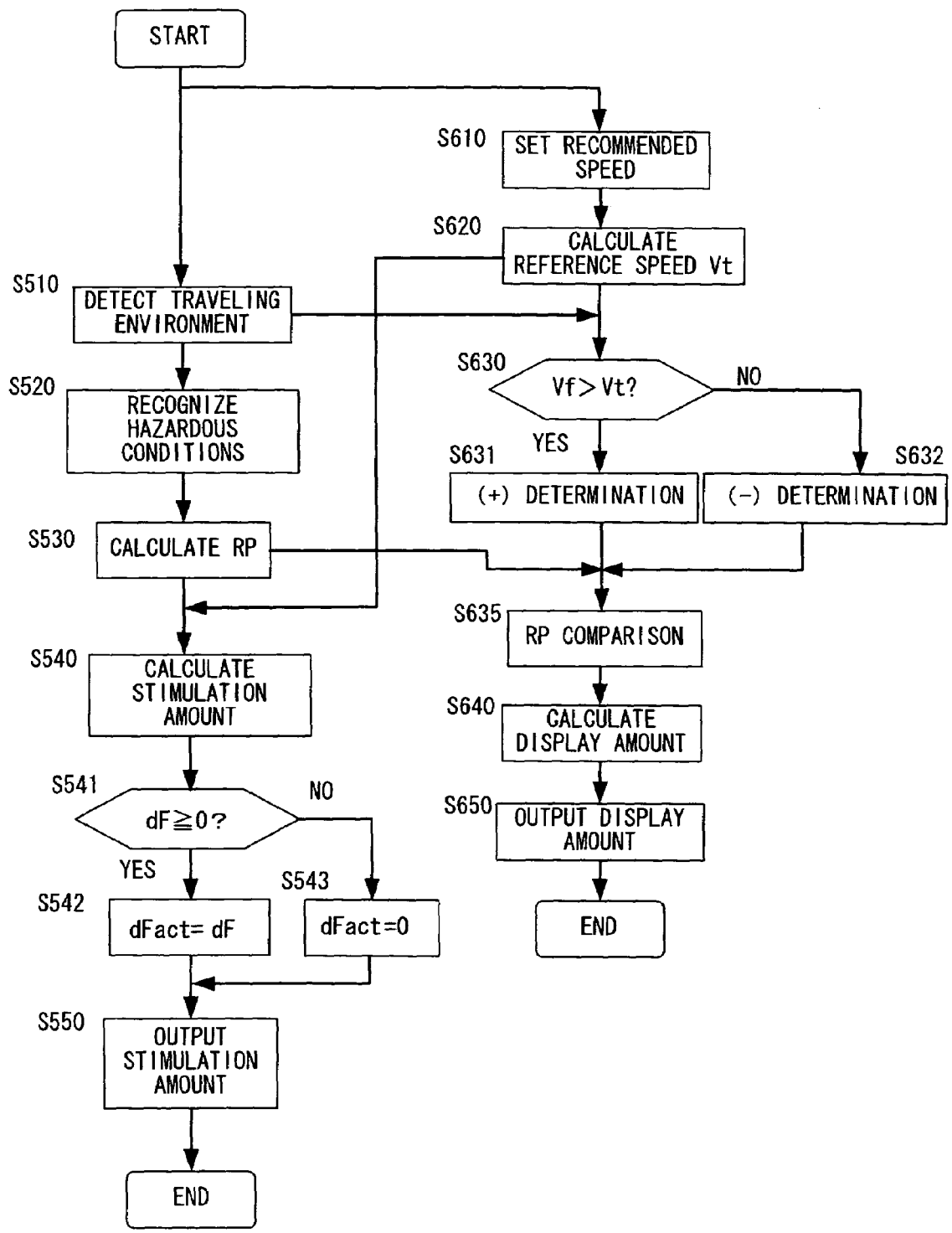
FIG. 14 is flow chart showing a processing sequence for a drive operation assist control program of the second embodiment.

FIG. 14 is a flow chart showing a processing sequence for a drive operation assist control process of the second embodiment. This processing is carried out continuously at fixed intervals or, for example, 50 msecs.

The processing in step S510 to step S530 and step S610 to step S650 is the same as the processing in step S110 to step S130 and step S210 to step S250 shown in the flowchart in FIG. 5.

In step S540, the stimulation amount calculator 60D calculates a reaction force control amount dF of the accelerator pedal 82 based on the risk potential RP calculated in step S530 and the difference (Vf−Vt) between the vehicle speed Vf and the reference speed Vt. Specifically, the reaction force control amount dF is calculated using different arithmetic equations depending on whether the risk potential RP is smaller or larger than the prescribed value RPa. First, a description is given of the method for calculating the reaction force control amount dF when the risk potential RP is equal to or greater than the prescribed value RPa.

Figure 16:
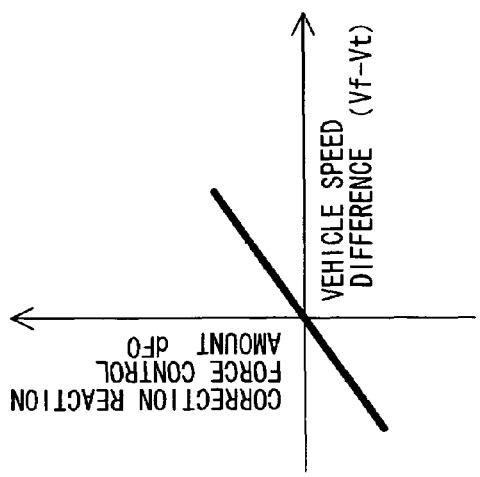
FIG. 16 is a view showing a relationship between speed difference and correction reaction force control amount.
Figure 15:
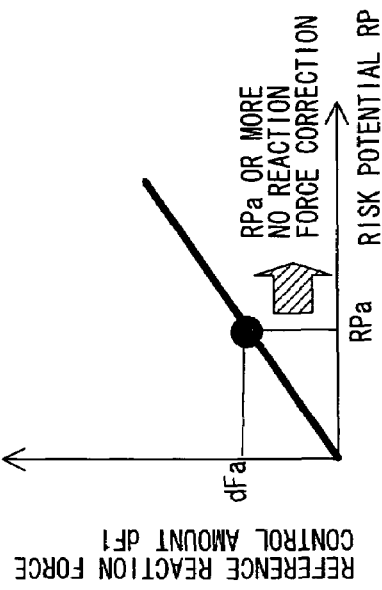
FIG. 15 is a view showing a relationship between risk potential and reference reaction force control amount.
Figure 17:
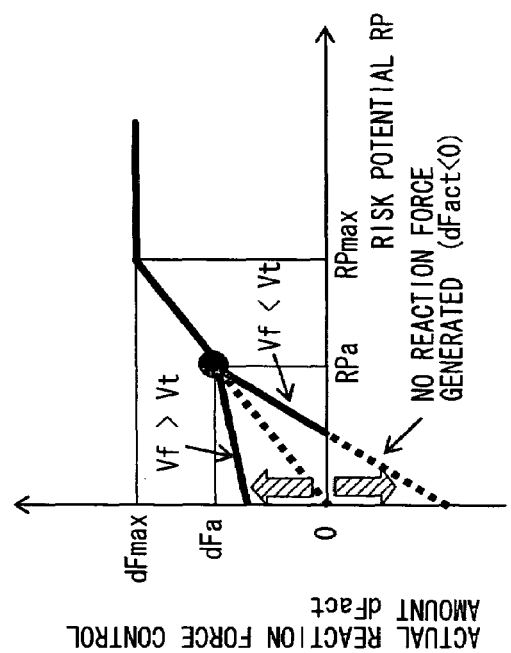
FIG. 17 is a view showing a relationship between risk potential and actual reaction force control amount.

The relationship between the risk potential RP and a reference reaction force control amount dF1 is shown in FIG. 15, and a correction reaction force control amount dF0 with respect to the vehicle speed difference (Vf−Vt) is shown in FIG. 16. The relationship between the risk potential RP and an actual reaction force control amount dFact is shown in FIG. 17. Here, the reaction force control amount dF actually outputted at the accelerator pedal reaction force control device 80 is taken to be an actual reaction force control amount dFact.

As shown in FIG. 15, the reference reaction force control amount dF1 increases in proportion to the risk potential RP. When the reference reaction force control amount dF1 corresponding to the risk potential RP which is at a prescribed value RPa is taken to be dFa, the reference reaction force control amount dF1 is expressed by the following (Equation 6).

$$dF1 = dFa/RPa \times RP \qquad \text{(Equation 6)}$$

When the risk potential RP is greater than the prescribed value RPa, the reference reaction force control amount dF1 itself is used as the reaction force control amount dF. Namely, the reaction force control amount dF can be expressed by (Equation 7) below.

$$dF = dFa/RPa \times RP \qquad \text{(Equation 7)}$$

In (Equation 7), $RP \geq RPa$.

On the other hand, when the risk potential RP is smaller than the prescribed value RPa, the reaction force control amount dF is calculated in such a manner that the accelerator pedal reaction force becomes larger when the vehicle speed Vf is faster than the reference speed Vt, whereas the accelerator pedal reaction force becomes smaller when the vehicle speed Vf is slower than the reference speed Vt. First, the difference (Vf−Vt) between the current vehicle speed Vf and the reference speed Vt is calculated, and the correction reaction force control amount dF0 is calculated according to the vehicle speed difference (Vf−Vt) as shown in FIG. 16. The correction reaction force control amount dF0 is calculated from (Equation 8) below using the constant k2.

$$dF0 = k2 \times (Vf - Vt) \qquad \text{(Equation 8)}$$

The correction reaction force control amount dF0 corresponds to the reaction force control amount dF when the risk potential RP=0, and the correction reaction force control amount dF0 increases as the vehicle speed Vf becomes larger with respect to the reference speed Vt. The reaction force control amount dF can be calculated from (Equation 9) below using the prescribed values RPa and dFa, and the correction reaction force control amount dF0.

$$dF = \{(dFa - dF0)/RPa\} \times RP + dF0 = \{(dFa - (k2 \times (Vf - Vt)))/RPa\} \times RP + k2 \times (Vf - Vt) \qquad \text{(Equation 9)}$$

In (Equation 9), RP<RPa.

When the vehicle is advancing at the reference speed Vt, i.e. when the vehicle speed difference (Vf−Vt)=0, (Equation 9) is equal to (Equation 7) described above.

In step S540, when the reaction force control amount dF is calculated as described above, step S541 is proceeded to. In step S541, it is determined whether or not the reaction force control amount dF calculated in step S540 is 0 or greater. When the reaction force control amount dF is 0 or more, step S542 is proceeded to, and the reaction force control amount dF calculated in step S540 is set as the actual reaction force control amount dFact. On the other hand, when the reaction force control amount dF is less than 0, step S543 is proceeded to, and the actual reaction force control amount dFact is set to zero.

As a result, as shown in FIG. 17, in cases where the risk potential RP is smaller than the prescribed value RPa, the actual reaction force control amount dFact becomes larger as the vehicle speed Vf becomes faster with respect to the reference speed Vt, whereas the actual reaction force control amount dFact becomes smaller as the vehicle speed Vf becomes slower with respect to the reference speed Vt. However, the minimum value for the actual reaction force control amount dFact is 0, and when the actual reaction force control amount dFact=0, no reaction force is applied to the accelerator pedal 82. Further, in the event that the risk potential RP is greater than the prescribed value RPa, then the actual reaction force control amount dFact is set only in accordance with the risk potential RP regardless of the vehicle speed difference (Vf−Vt). When the risk potential RP exceeds a maximum value RPmax, the actual reaction force control amount dFact is fixed at a maximum value dFmax.

In step S550, the actual reaction force control amount dFact set in step S542 or S543 is outputted to the accelerator pedal reaction force control device 80. The accelerator pedal reaction force control device 80 controls accelerator pedal reaction force according to instructions from the controller 61 so as to convey the risk potential RP of the vehicle surroundings to the driver as haptic information.

Further, the display amount calculated in step S640 is outputted to the display device 110 in step S650. The display device 110 displays display content corresponding to an instruction from the controller 61 at the display monitor, and transmits the risk potential RP to the driver together with recommended speed information as visual information.

The following is a description of the operation of the driving assist system for vehicle 2 of the second embodiment of the present invention using FIG. 18A to FIG. 23C. Here, a description is given taking examples of changes in accelerator pedal reaction force and changes in the content displayed at the display device 110 in the event that the vehicle approaches the preceding vehicle.

FIG. 18A to FIG. 20C are views showing change over time of the risk potential, change over time of the actual reaction force control amount dFact, and example displays at the display device 110 in the event that the vehicle speed Vf is faster than the reference speed Vt. FIG. 21A to FIG. 23C are views showing change over time of the risk potential in the event that the vehicle speed Vf is slower than the reference speed Vt, change over time of the actual reaction force control amount dFact, and example displays at the display device 110. First, a description is given of the case where the vehicle is traveling at a speed faster than the reference speed Vt.

The current risk potential RP (at time point t=0) is shown by a filled circle ● in the change of risk potential over time shown in FIG. 18A. In FIG. 18B, the current actual reaction force control amount dFact (at time point t=0) is shown by a filled circle ●. The actual reaction force control amount dFact changes as shown by the solid line in FIG. 18B according to changes in the risk potential RP. The actual reaction force control amount dFact in the event that the vehicle is traveling at the reference speed Vt (Vf=Vt) is shown by the dashed line in FIG. 18B. As the vehicle speed Vf is faster than the reference speed Vt, when the risk potential RP=0 (t=0), the actual reaction force control amount dFact=dF0. Namely, the risk potential RP is zero but reaction force is applied to the accelerator pedal 82 according to the vehicle speed difference (Vf−Vt).

Since the risk potential RP=0 and there is no preceding vehicle, only the subject vehicle A is displayed between the lane markers B at the display monitor of the display device 110, as shown in FIG. 18C. At this time, the road between the lane markers B is displayed using a light (pale) color at the display monitor.

As the risk potential RP increases as shown in FIG. 19A after detection of a preceding vehicle, the actual reaction force control amount dFact also increases as shown in FIG. 19B. A large actual reaction force control amount dFact is therefore applied to the accelerator pedal 82 compared with the case where the vehicle travels at the reference speed Vt. At this time, the vehicle A and the preceding vehicle C above the vehicle A are displayed at the display monitor, as shown in FIG. 19C. Between the vehicle A and the preceding vehicle C is used as a display area for the risk potential RP and the risk potential is displayed in stages using indicator bars. Here, the number of indicator bars displayed represents the magnitude of the risk potential RP.

Further, as in the case where a preceding vehicle does not exist (refer to FIG. 18C), the road between the lane markers B is displayed using a light color. The preceding vehicle C and the risk potential RP are then displayed using a color that is dark with respect to the color of displaying the road so that the contrast between the preceding vehicle C and risk potential RP and the road is substantial.

When the risk potential RP is greater than or equal to the risk potential RP as shown in FIG. 20A, correction of the actual reaction force control amount dFact according to the vehicle speed difference (Vf−Vt) is not carried out. Changes in the actual reaction force control amount dFact therefore become equal to changes in the actual reaction force control amount dFact of the reference speed as shown by the dotted line, as shown in FIG. 20B. Namely, the actual reaction force control amount dFact is added to the accelerator pedal 82 according to the risk potential RP regardless of the vehicle speed difference (Vf−Vt). As shown in FIG. 20C, when the risk potential RP of the vehicle surroundings increases, the number of indicator bars displayed in the risk potential display area also increases. In this case also, the road between the lane markers B is displayed using a light color, so that the preceding vehicle C and the risk potential RP stand out with respect to the road.

Next, a description is given of the case where the vehicle is traveling at a speed slower than the reference speed Vt.

The current risk potential RP (at time point t=0) is shown by a filled circle ● in the change of risk potential over time shown in FIG. 21A. In FIG. 21B, the current actual reaction force control amount dFact (at time point t=0) is shown by a filled circle ●. The actual reaction force control amount dFact changes as shown by the solid line in FIG. 21B according to changes in the risk potential RP. The actual reaction force control amount dFact in the event that the vehicle is traveling at the reference speed Vt (Vf=Vt) is shown by the dashed line in FIG. 21B. As the vehicle speed Vf is slower than the reference speed Vt, when the risk potential RP=0 (t=0), the actual reaction force control amount dFact=0. Namely, when the risk potential RP is zero, reaction force is not applied to the accelerator pedal 82.

Since the risk potential RP=0 and there is no preceding vehicle, only the vehicle A is displayed between the lane markers B at the display monitor of the display device 110, as shown in FIG. 21C. At this time, the road between the lane markers B is displayed using a dark color at the display monitor.

As the risk potential RP increases as shown in FIG. 22A, the actual reaction force control amount dFact is also increased as shown in FIG. 22B. However, because the vehicle speed Vf is slower than the reference speed Vt, a small actual reaction force control amount dFact is applied to the accelerator pedal 82 compared with the case where the vehicle travels at the reference speed Vt.

At this time, the vehicle A and the preceding vehicle above the vehicle A are displayed at the display monitor, as shown in FIG. 22C. Between the vehicle A and the preceding vehicle C is used as a display area for the risk potential RP and the risk potential is displayed in stages using indicator bars. The road between the lane markers B is displayed using a color that is dark compared to the case where the vehicle speed Vf is faster than the reference speed Vt, i.e. the road is displayed using a color close to that used for displaying the preceding vehicle C and the risk potential RP.

When the risk potential RP is greater than or equal to the predetermined value RPa as shown in FIG. 23A, correction of the actual reaction force control amount dFact according to the vehicle speed difference (Vf−Vt) is not carried out. Changes in the actual reaction force control amount dFact therefore become equal to changes in the actual reaction force control amount dFact of the reference speed as shown by the dotted line, as shown in FIG. 23B. Namely, the actual reaction force control amount dFact is added to the accelerator pedal 82 according to the risk potential RP regardless of the vehicle speed difference (Vf−Vt). However, the road between the lane markers B is changed to be displayed in a light color as shown in FIG. 23C, so that the displaying of the preceding vehicle C and risk potential RP stands out on the display monitor as in the case where the vehicle speed Vf is faster than the reference speed Vt.

As described above in the second embodiment, the following operational effects are also obtained in addition to the results for the first embodiment described above.

(1) The driving assist system for vehicle 2 conveys the risk potential RP relating to a direction from front to rear of the vehicle and information relating to the reference speed Vt of the road on which the vehicle is traveling via sense of touch. As a result, it is possible to convey the current risk potential RP and impending risk to the vehicle that can be predicted from the reference speed Vt to the driver.

(2) At the driving assist system for vehicle 2, the risk potential RP and information related to the reference speed Vt are conveyed to the driver as accelerator pedal reaction force. It is therefore possible to reliably convey information by using reaction force of the accelerator pedal 82 with which the driver is almost always in contact.

(3) The necessary information determination unit 60C of the controller 61 determines information to be conveyed to the driver as accelerator pedal reaction force from the risk potential RP and the reference speed Vt. As a result, it is possible to effectively convey information that is necessary to be known by the driver.

(4) The stimulation amount calculator 60D of the controller 61 corrects the reaction force control amount dF calculated using the risk potential RP according to the determination results of the necessary information determination unit 60C, and a corrected reaction force control amount dFact is generated at the accelerator pedal 82. As a result, it is possible to effectively convey information which is necessary for the driver to be aware of as accelerator pedal reaction force. In the second embodiment, the reaction force control amount dF is corrected according to the determination results of the necessary information determination unit 60C. However, the reaction force control amount dF is a value calculated according to the risk potential RP. It is therefore possible to obtain the same results by correcting the risk potential RP according to the determination results and calculate the reaction force control amount dF using the corrected risk potential RP. Namely, as long as the reaction force according to the risk potential RP and information relating to the reference speed Vt can be generated at the accelerator pedal 82, it is possible to correct either one of the risk potential RP and reaction force control amount dF, or to correct both.

(5) When the vehicle speed Vf is faster than the reference speed Vt, the controller 61 performs correction so that the risk potential RP becomes larger, and when the vehicle speed Vf is slower than the reference speed Vt, the controller 61 performs correction so that the risk potential RP becomes smaller. In this embodiment, the reaction force control amount dF is corrected according to the risk potential RP instead of correcting the risk potential RP. Specifically, the reference reaction force control amount dF1 is calculated according to the risk potential RP calculated by the risk potential calculator 60B, and the correction reaction force control amount dF0 is calculated according to the difference (Vf−Vt) between the reference speed Vt and the vehicle speed Vf. The reaction force control amount dF is then calculated using the reference reaction force control amount dF1 and the correction reaction force control amount dF0. As a result, the reaction force control amount dF can be calculated by adding a value corresponding to information relating to the reference speed Vt to the reference reaction force control amount dF1 according to the risk potential RP. As shown in FIG. 17, correction is performed in such a manner that the actual reaction force control amount dFact becomes larger compared to the case where the vehicle is traveling at the reference speed Vt in the case where the vehicle speed Vf is faster than the reference speed Vt, and that the actual reaction force control amount dFact is corrected so as to become smaller in cases where the vehicle speed Vf is slower than the reference speed Vt. As a result, it is possible to convey to the driver whether the vehicle speed Vf is faster or slower than the reference speed Vt using accelerator pedal reaction force. Therefore, it is possible to intuitively make the driver aware of impending risk together with the current risk potential.

(6) The controller 61 corrects the risk potential RP when the risk potential RP is smaller than the prescribed value RPa. Here, the reaction force control amount dF calculated based on the risk potential RP is corrected when the risk potential RP is smaller than the prescribed value RPa. Specifically, as shown in FIG. 17, the actual reaction force control amount dFact is calculated using the reference reaction force control amount dF1 and the correction reaction force control amount dF0 in the region where the risk potential RP is smaller than the prescribed value RPa, and the actual reaction force control amount dFact is calculated using the reference reaction force control amount dF1 in the region where the risk potential RP is equal to or greater than the prescribed value RPa. As a result, when the risk potential RP is equal to or greater than the prescribed value RPa, the information for the risk potential RP is made known in a preferential manner to the driver as accelerator pedal reaction force. On the other hand, when the risk potential RP is smaller than the prescribed value RPa, information relating to the reference speed Vt is also made known to the driver as accelerator pedal reaction force together with the risk potential, and impending risk can be conveyed to the driver in an intuitive manner.

(7) The driving assist system for vehicle 2 is equipped with the display device 110 for displaying the risk potential RP and information relating to the reference speed Vt. As a result of displaying these information, assistance can be provided to the driver in recognizing information through the sense of touch, i.e. through accelerator pedal reaction force. In the second embodiment, background color displayed at the display device 110 is changed according to results of comparing the vehicle speed Vf and the reference speed Vt. However, this is by no means limiting, and it is also possible to fix the background color and only display the risk potential RP. In this case also, the risk potential is conveyed to the driver as visual information, and the driver is aided in identifying the risk potential RP via the accelerator pedal reaction force.

(8) The necessary information determination unit 60C of the controller 61 compares the vehicle speed Vf and the reference speed Vt, and the display quantity calculator 60E sets display content of the display device 110 according to the comparison results. Specifically, as shown in FIG. 18C to FIG. 20C, the contrast between the preceding vehicle C and risk potential RP and the background on the display monitor is made larger in the case where the vehicle speed Vf is faster than the reference speed Vt. On the other hand, as shown in FIG. 21C to FIG. 22C, the contrast between the preceding vehicle C and risk potential RP and the background on the display monitor is made smaller in the case where the vehicle speed Vf is slower than the reference speed Vt. It is to be noted that the risk potential RP and prescribed value RPa are compared at the necessary information determination unit 60C, and even in the event that the vehicle speed Vf is slower than the reference speed Vt, the contrast between the preceding vehicle C and risk potential RP and the background is made large as shown in FIG. 2 when the risk potential RP is greater than the prescribed value RPa. In this manner, it is possible for the driver to easily recognize the risk potential RP. It is therefore possible to effectively make the driver aware of the current risk potential and the impending risk by setting the display content from the risk potential RP and information relating to the reference speed Vt.

Modified Example of the Second Embodiment

In the second embodiment described above, the road color at the display monitor is decided based on the risk potential RP and the vehicle speed difference (Vf–Vt), and the reaction force control amount dF is corrected using the vehicle speed difference (Vf–Vt) only in the event that the risk potential RP is smaller than the prescribed value RPa. Here, a description is given of an example where the road color is decided based only on the vehicle speed difference (Vf–Vt) and the reaction force control amount dF is corrected regardless of the size of the risk potential RP.

Figure 24:
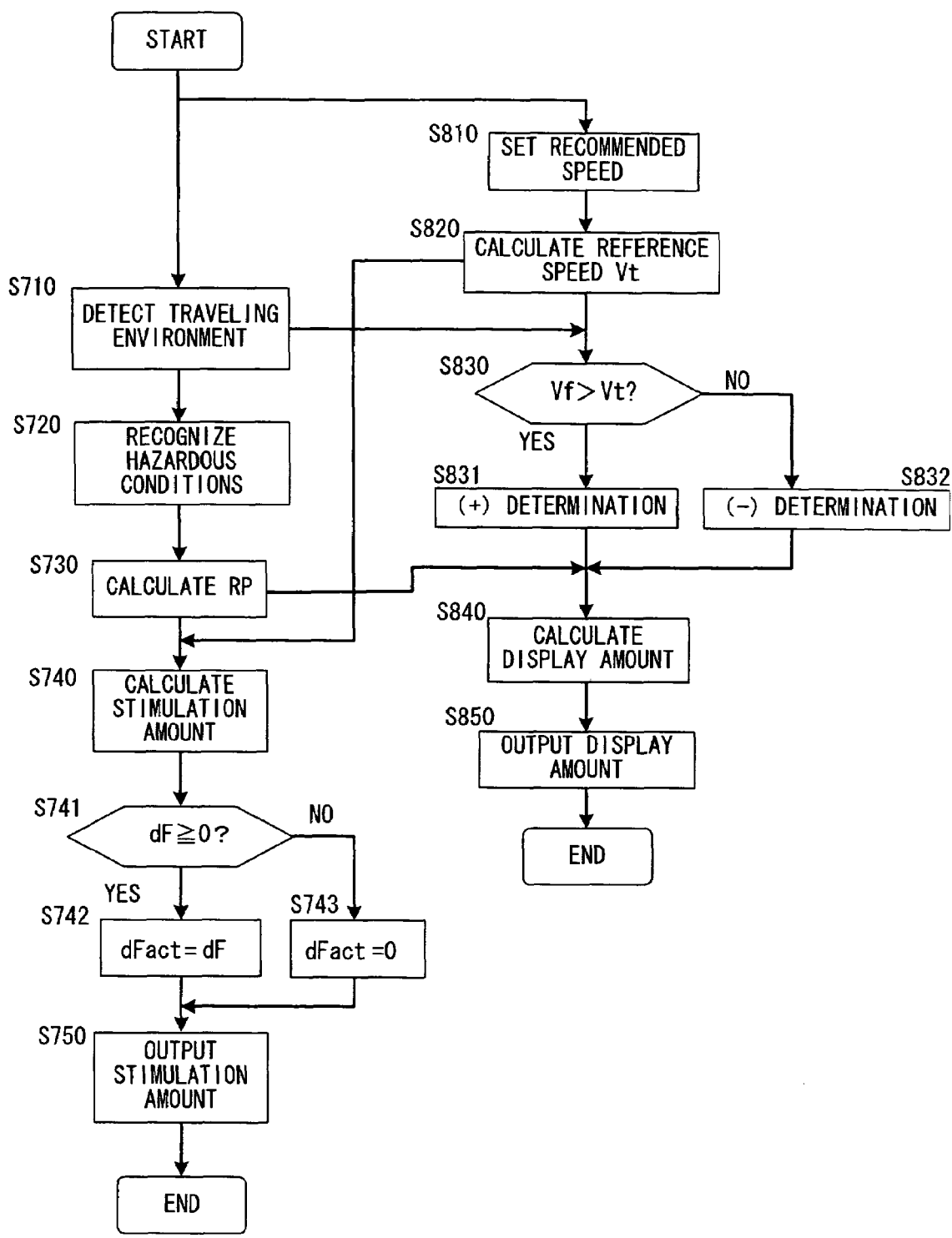
FIG. 24 is a flow chart showing a processing sequence for a drive operation assist control program of a modified example of the second embodiment.

FIG. 24 shows a flow chart showing a processing sequence for a drive operation assist control process of a modified example of the second embodiment. This processing is carried out continuously at fixed intervals of, for example, 50 msecs.

The processing in step S710 to step S730 and step S810 to step S832 is the same as the processing in step S510 to step S530 and step S610 to step S632 shown in the flowchart in FIG. 14.

Figure 25:
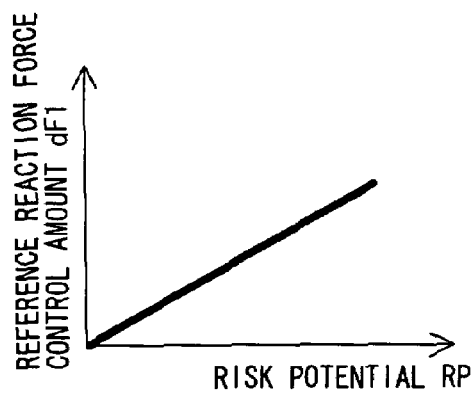
FIG. 25 is a view showing a relationship between risk potential and reference reaction force control amount.
Figure 26:
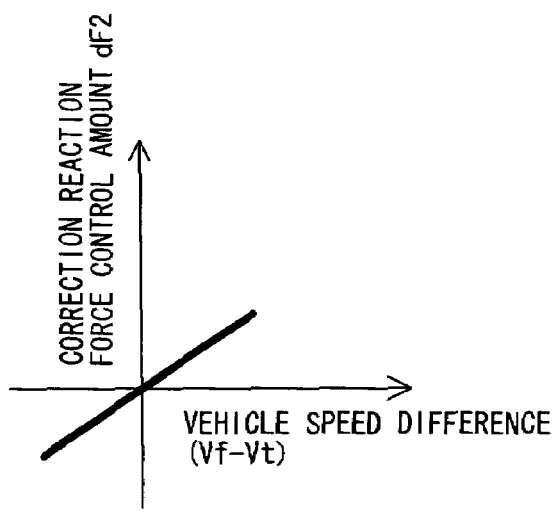
FIG. 26 is a view showing a relationship between speed difference and correction reaction force control amount.
Figure 27:
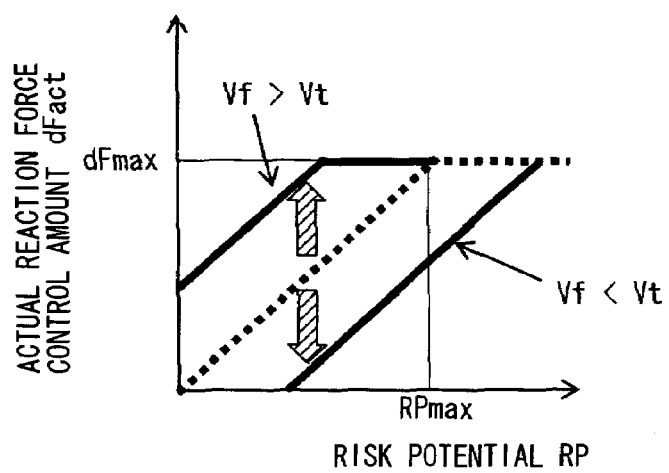
FIG. 27 is a view showing a relationship between risk potential and actual reaction force control amount.

In step S740, the stimulation amount calculator 60D calculates reaction force control amount dF of the accelerator pedal 82 based on the risk potential RP calculated in step S730 and the difference (Vf–Vt) between the vehicle speed Vf and the reference speed Vt. The relationship between the risk potential RP and the reference reaction force control amount dF1 is shown in FIG. 25, and the relationship between the vehicle speed difference (Vf–Vt) and the correction reaction force control amount dF2 is shown in FIG. 26. The relationship between the risk potential RP and the actual reaction force control amount dFact is shown in FIG. 27. Here, the reaction force control amount dF actually outputted at the accelerator pedal reaction force control device 80 is taken to be an actual reaction force control amount dFact.

As shown in FIG. 25, the reference reaction force control amount dF1 increases in proportion to the risk potential RP. The reference reaction force control amount dF1 can be expressed by (Equation 10) using the constant k1.

$$dF1 = k1 \times RP \quad \text{(Equation 10)}$$

The correction reaction force control amount dF2 is proportional to the vehicle speed difference (Vf–Vt), as shown in FIG. 26. The correction reaction force control amount dF2 can be expressed by (Equation 11) using the constant k2.

$$dF2 = k2 \times (Vf - Vt) \quad \text{(Equation 11)}$$

The reaction force control amount dF is calculated using the reference reaction force control amount dF1 calculated from (Equation 10) and the correction reaction force control amount dF2 calculated from (Equation 11). The reaction force control amount dF is a value obtained by adding the correction reaction force control amount dF2 to the reference reaction force control amount dF1 and is calculated from (Equation 12) below.

$$dF = dF1 + dF2 \quad \text{(Equation 12)}$$

In step S740, when the reaction force control amount dF is calculated as described above, step S741 is proceeded to. In step S741, it is determined whether or not the reaction force control amount dF calculated in step S740 is 0 or greater. When the reaction force control amount dF is 0 or more, step S742 is proceeded to, and the reaction force control amount dF calculated in step S740 is set as the actual reaction force control amount dFact. On the other hand, when the reaction force control amount dF is less than 0, step S743 is proceeded to, and the actual reaction force control amount dFact is set to zero.

As a result, the actual reaction force control amount dFact becomes larger as the vehicle speed Vf becomes faster with respect to the reference speed Vt as shown in FIG. 27, and the actual reaction force control amount dFact becomes smaller as the vehicle speed Vf becomes slower with respect to the reference speed Vt. However, the minimum value for the actual reaction force control amount dFact is 0, and when the actual reaction force control amount dFact=0, accelerator pedal reaction force is not to be generated.

As shown by the dotted line in FIG. 27, in the event that the vehicle speed Vf is equal to the reference speed Vt, when the risk potential RP exceeds the maximum value RPmax, the actual reaction force control amount dFact is fixed at the maximum value dFmax. The upper limit of the actual reaction force control amount dFact is limited to the maximum value dFmax when the vehicle speed Vf is either faster than the reference speed Vt or slower. After the actual reaction force control amount dFact reaches the maximum value dFmax, the actual reaction force control amount dFact does not change even if the risk potential RP further increases.

In step S750, the actual reaction force control amount dFact set in step S742 or S743 is outputted to the accelerator pedal reaction force control device 80.

In step S840, the display quantity calculator 60E decides the display content of the risk potential RP displayed at the display device 110. Specifically, the background color, i.e. the display color of the road, is decided in accordance with determination results for the background color determined in step S831 or step S832 according to the results of comparing the vehicle speed Vf and the reference speed Vt. Further, the number of indicator bars displayed as the risk potential RP is decided based on the risk potential RP calculated in step S730. In step S850, the display amount calculated in step S840 is outputted to the display device 110. This terminates the processing for this time.

The following is a description of the operation of the driving assist system for vehicle 2 of the modified example of the second embodiment of the present invention using FIG. 28A to FIG. 33C. Here, a description is given taking examples of changes in accelerator pedal reaction force and changes in the content displayed at the display device 110 in the event that the vehicle approaches the preceding vehicle.

FIG. 28A to FIG. 30C are views showing change over time of the risk potential in the event that the vehicle speed Vf is faster than the reference speed Vt, change over time of the actual reaction force control amount dFact, and example displays at the display device 110. FIG. 31A to FIG. 33C are views showing change over time of the risk potential in the event that the vehicle speed Vf is slower than the reference speed Vt, change over time of the actual reaction force control amount dFact, and example displays at the display device 110. First, a description is given of the case where the vehicle is traveling at a speed faster than the reference speed Vt.

The current risk potential RP (at time point t=0) is shown by a filled circle ● in the change of risk potential over time shown in FIG. 28A. In FIG. 28B, the current actual reaction force control amount dFact (at time point t=0) is shown by a filled circle ●. The actual reaction force control amount dFact changes as shown by the solid line in FIG. 28B according to changes in the risk potential RP. The actual reaction force control amount dFact in the event that the vehicle is traveling at the reference speed Vt (Vf=Vt) is shown by the dashed line in FIG. 28B. As the vehicle speed Vf is faster than the reference speed Vt, reaction force is added to the accelerator pedal 82 according to the vehicle speed difference (Vf−Vt) even when the risk potential RP=0 (t=0).

Since the risk potential RP=0 and there is no preceding vehicle, only the vehicle A is displayed between the lane markers B at the display monitor of the display device 110, as shown in FIG. 28C. At this time, the road is displayed using a light (pale) color at the display monitor.

As the risk potential RP increases as shown in FIG. 29A after detection of a preceding vehicle, the actual reaction force control amount dFact also increases as shown in FIG. 29B. A large actual reaction force control amount dFact is therefore applied to the accelerator pedal 82 compared with the case where the vehicle travels at the reference speed Vt. At this time, the vehicle A and the preceding vehicle C above the vehicle A are displayed at the display monitor, as shown in FIG. 29C. Between the vehicle A and the preceding vehicle C is used as a display area for the risk potential RP and the risk potential is displayed in stages using indicator bars. The preceding vehicle C and the risk potential RP are displayed using a dark color with respect to the color displayed for the road between the lane markers B so that the contrast between the preceding vehicle C and risk potential RP and the road is substantial.

When the risk potential RP then further increases and exceeds the maximum value RPmax as shown in FIG. 30A, the actual reaction force control amount dFact is fixed at the maximum value dFmax as shown in FIG. 30B. As a result, the maximum reaction force control amount is added to the accelerator pedal 82. In this case also, the road between the lane markers B is displayed using a light color as shown in FIG. 30C, so that the preceding vehicle C and the risk potential RP stand out with respect to the road.

Next, a description is given of the case where the vehicle is traveling at a speed slower than the reference speed Vt.

The current risk potential RP (at time point t=0) is shown by a filled circle ● in the change of risk potential over time shown in FIG. 31A. In FIG. 31B, the current actual reaction force control amount dFact (at time point t=0) is shown by a filled circle ●. The actual reaction force control amount dFact changes as shown by the solid line in FIG. 31B according to changes in the risk potential RP. The actual reaction force control amount dFact in the event that the vehicle is traveling at the reference speed Vt (Vf=Vt) is shown by the dashed line in FIG. 31B. As the vehicle speed Vf is slower than the reference speed Vt, and reaction force is not added to the accelerator pedal 82 when the risk potential RP=0 (t=0).

Since the risk potential RP=0 and there is no preceding vehicle, only the vehicle A is displayed between the lane markers B at the display monitor of the display device 110, as shown in FIG. 31C. At this time, the road between the lane markers B is displayed using a dark color at the display monitor.

As the risk potential RP increases as shown in FIG. 32A after detection of a preceding vehicle, the actual reaction force control amount dFact is also increased as shown in FIG. 32B. However, because the vehicle speed Vf is slower than the reference speed Vt, a small actual reaction force control amount dFact is applied to the accelerator pedal 82 compared with the case where the vehicle travels at the reference speed Vt.

At this time, the vehicle A and the preceding vehicle C above the vehicle A are displayed at the display monitor, as shown in FIG. 32C. Between the vehicle A and the preceding vehicle C is used as a display area for the risk potential RP and the risk potential is displayed in stages using indicator bars. The road between the lane markers B is displayed using a color that is dark compared to the case where the vehicle speed Vf is faster than the reference speed Vt, i.e. the road is displayed using a color close to that used for displaying the preceding vehicle C and the risk potential RP.

When the risk potential RP exceeds the maximum value RPmax and becomes larger still as shown in FIG. 33A, the actual reaction force control amount dFact is fixed at the maximum value dFmax as shown in FIG. 33B. As a result, the maximum reaction force control amount is applied to the accelerator pedal 82. At this time, the vehicle A, preceding vehicle C and risk potential RP are displayed between the lane markers B as shown in FIG. 33C at the display monitor. The road between the lane markers B is displayed using a dark color, i.e. is displayed using a color close to that displayed for the preceding vehicle C and the risk potential RP because the vehicle speed Vf is slower than the reference speed Vt.

As described above in the modified example of the second embodiment, the following operational effects are also obtained in addition to the results for the second embodiment described above.

When the vehicle speed Vf is faster than the reference speed Vt, the controller 61 performs correction so that the risk potential RP becomes larger, and when the vehicle speed Vf is slower than the reference speed Vt, the controller 61 performs correction so that the risk potential RP becomes smaller. In this embodiment, the reaction force control amount dF is corrected according to the risk potential RP rather than correcting the risk potential RP. Specifically, the reference reaction force control amount dF1 is calculated according to the risk potential RP calculated by the risk potential calculator 60B, and the correction reaction force control amount dF0 is calculated according to the difference (Vf−Vt) between the reference speed Vt and the vehicle speed Vf. The reaction force control amount dF is calculated by adding the reference reaction force control amount dF1 and the correction reaction force control amount dF2. As a result, the reaction force control amount dF can be calculated by adding a value corresponding to information relating to the reference speed Vt to the reference reaction force control amount dF1 according to the risk potential RP. As shown in FIG. 27, correction is performed in such a manner that the actual reaction force control amount dFact becomes larger compared to the case where the vehicle is traveling at the reference speed Vt in the case where the vehicle speed Vf is faster than the reference speed Vt, and the actual reaction force control amount dFact is corrected so as to become smaller in cases where the vehicle speed Vf is slower than the reference speed Vt. As a result, it is possible to convey to the driver whether the vehicle speed Vf is faster or slower than the reference speed Vt using accelerator pedal reaction force, and it is possible to intuitively make the driver aware of impending risk together with the current risk potential.

In the modified example of the second embodiment, the reaction force control amount dF is corrected regardless of the magnitude of the risk potential RP. It is therefore possible to calculate an actual reaction force control amount dFact incorporating information relating to the reference speed Vt using simple techniques.

Third Embodiment

Figure 34:
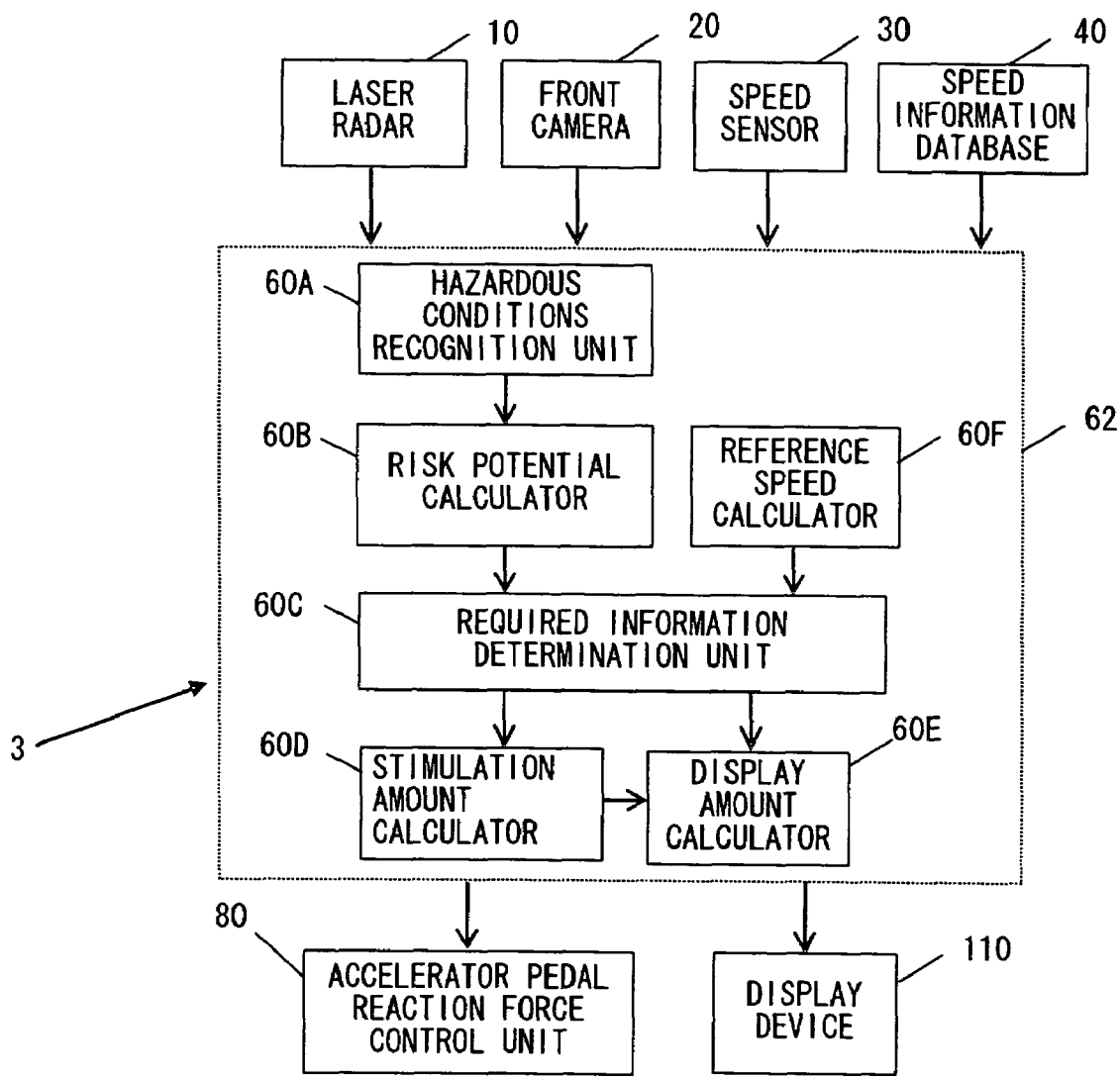
FIG. 34 is a block view showing the configuration of the inside and periphery of a controller in a third embodiment.

The following is a description of a driving assist system for vehicle of a third embodiment of the present invention. FIG. 34 shows a configuration of a driving assist system for vehicle 3 of the third embodiment and particularly shows a block view of the configuration of the inside of and surroundings of a controller 62. In FIG. 34, parts having the same function as in the second embodiment shown in FIG. 13 are given the same numerals. Here, a description mainly focuses on the points of distinction with the second embodiment, and particularly with the modified example of the second embodiment.

In the third embodiment, as with the second embodiment described above, information relating to the recommended speed Vt0 or reference speed Vt is conveyed to the driver together with the risk potential RP for the vehicle surroundings through sense of touch. Further, haptic information to be conveyed to the driver, i.e. reaction force control amount and information relating to the recommended speed Vt0 is displayed at the display device 110 in place of the risk potential RP for the vehicle surroundings.

As shown in FIG. 34, in addition to a signal from the necessary information determination unit 60C, a signal from the stimulation amount calculator 60D is also inputted at the display quantity calculator 60E. The display quantity calculator 60E thus decides upon content to be displayed at the display device 110 based on the reference speed Vt calculated by the reference speed calculator 60F and reaction force control amount dF calculated by the stimulation amount calculator 60D. The method for calculating the risk potential RP for the vehicle surroundings at the risk potential calculator 60B and the method for calculating the reaction force control amount dF at the stimulation amount calculator 60D are the same as for the modified example of the second embodiment. Namely, in the third embodiment, the reaction force control amount dF according to the risk potential RP of the vehicle surroundings is corrected using the difference (Vf−Vt) between the vehicle speed Vf and the reference speed Vt, and accelerator pedal reaction force control is carried out based on the corrected reaction force control amount dF.

Figure 35:
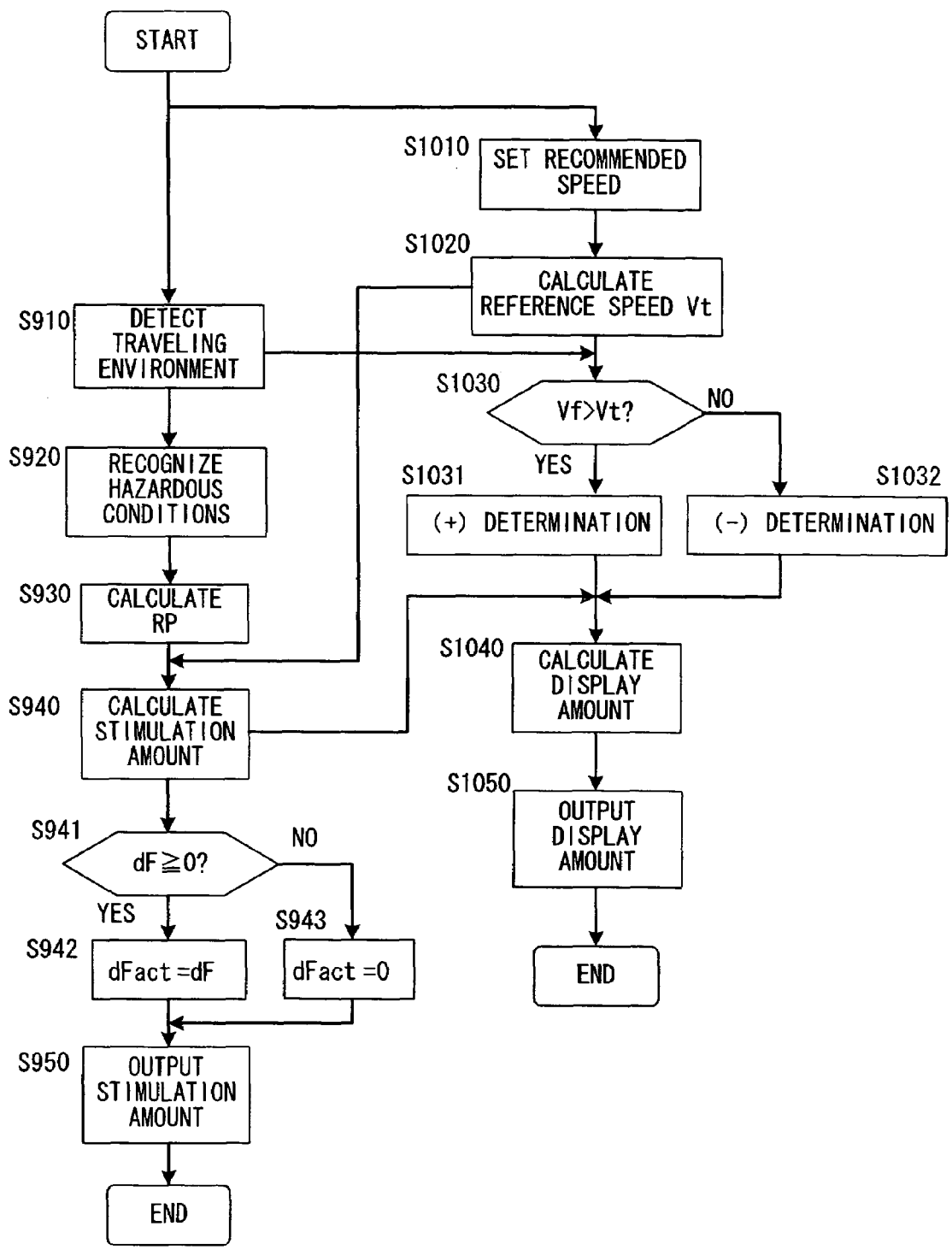
FIG. 35 is flow chart showing a processing sequence for a drive operation assist control program of the third embodiment.

The following is a detailed description using FIG. 35 of the operation of the driving assist system for vehicle 3 of the third embodiment. FIG. 35 is flow chart showing a processing sequence for a drive operation assist control process of the third embodiment. This processing is carried out continuously at fixed intervals of, for example, 50 msecs.

The processing in step S910 to step S950 and step S1010 to step S1032 is the same as the processing in step S710 to step S750 and step S810 to step S832 shown in the flowchart in FIG. 24.

In step S1040, the display quantity calculator 60E decides the display content displayed at the display device 110. Specifically, the background color, i.e. the display color of the road, is decided in accordance with determination results for the background color determined in step S1031 to step S1032 according to the results of comparing the vehicle speed Vf and the reference speed Vt. Further, a display amount for displaying the reaction force control amount dF calculated in step S940 is decided. Here, the number of indicator bars is decided according to the calculated reaction force control amount dF in order to display the reaction force control amount dF in stages using indicator bars as will be described later. In step S1050, the display amount calculated in step S1040 is outputted to the display device 110. This terminates the processing for this time.

The following is a description of the driving assist system for vehicle 3 of the third embodiment of the present invention using FIG. 36A to FIG. 41C. Here, a description is given taking examples of changes in accelerator pedal reaction force and changes in the content displayed at the display device 110 in the event that the vehicle approaches the preceding vehicle.

FIG. 36A to FIG. 36C are views showing change over time of the risk potential in the event that the vehicle speed Vf is faster than the reference speed Vt, change over time of the actual reaction force control amount dFact, and example displays at the display device 110. FIG. 39A to FIG. 41C are views showing change over time of the risk potential in the event that the vehicle speed Vf is slower than the reference speed Vt, change over time of the actual reaction force control amount dFact, and example displays occurring at the display device 110. First, a description is given of the case where the vehicle is traveling at a speed faster than the reference speed Vt.

The current risk potential RP (at time point t=0) is shown by a filled circle ● in the change of risk potential over time shown in FIG. 36A. In FIG. 36B, the current actual reaction force control amount dFact (at time point t=0) is shown by a filled circle ●. The actual reaction force control amount dFact changes as shown by the solid line in FIG. 36B according to changes in the risk potential RP. The actual reaction force control amount dFact in the event that the vehicle is traveling at the reference speed Vt (Vf=Vt) is shown by the dashed line in FIG. 36B. As the vehicle speed Vf is faster than the reference speed Vt, reaction force is added to the accelerator pedal 82 according to the vehicle speed difference (Vf−Vt) even when the risk potential RP=0 (t=0).

Since there is no preceding vehicle, the vehicle A is displayed between the lane markers B at the display monitor of the display device 110, as shown in FIG. 36C. The actual reaction force control amount dFact is generated even when the risk potential RP=0 because the vehicle speed Vf is faster than the reference speed Vt. The actual reaction force control amount dFact is therefore displayed above the vehicle A on the display monitor using indicator bars, the number of which changes in stages according to the magnitude of the actual reaction force control amount dFact. Namely, the region above the vehicle A on the display monitor is used as a reaction force display area. Further, the road between the lane markers B is displayed using a light (pale) color at the display monitor.

As the risk potential RP increases as shown in FIG. 37A after the detection of a preceding vehicle, the actual reaction force control amount dFact also increases as shown in FIG. 37B. A large actual reaction force control amount dFact is therefore applied to the accelerator pedal 82 compared with the case where the vehicle travels at the reference speed Vt. At this time, the vehicle A and the preceding vehicle C at the upper part of the reaction force display area are displayed together at the display monitor as shown in FIG. 37C. The preceding vehicle C and the actual reaction force control amount dFact are displayed using colors that are dark with respect to the color for displaying the road between the lane markers B so that the contrast between the preceding vehicle C and actual reaction force control amount dFact and the road is therefore substantial.

When the risk potential RP then further increases and exceeds the maximum value RPmax as shown in FIG. 38A, the actual reaction force control amount dFact is fixed at the maximum value dFmax as shown in FIG. 38B. As a result, the maximum reaction force control amount is applied to the accelerator pedal 82. In this case also, the road between the lane markers B is displayed using a light color as shown in FIG. 38C, so that the preceding vehicle C and actual reaction force control amount dFact stand out with respect to the road.

Next, a description is given of the case where the vehicle is traveling at a speed slower than the reference speed Vt.

The current risk potential RP (at time point t=0) is shown by a filled circle ● in the change of risk potential over time shown in FIG. 39A. In FIG. 39B, the current actual reaction force control amount dFact (at time point t=0) is shown by a filled circle ●. The actual reaction force control amount dFact changes as shown by the solid line in FIG. 39B according to changes in the risk potential RP. The actual reaction force control amount dFact in the event that the vehicle is traveling at the reference speed Vt (Vf=Vt) is shown by the dashed line in FIG. 39B. As the vehicle speed Vf is slower than the reference speed Vt, reaction force is not added to the accelerator pedal 82 when the risk potential RP=0 (t=0).

Only the vehicle A is displayed between the lane markers B at the display monitor of the display device 110 as shown in FIG. 39C because there is no preceding vehicle and the actual reaction force control amount dFact=0. At this time, the road between the lane markers B is displayed using a dark color at the display monitor.

As the risk potential RP increases as shown in FIG. 40A after the detection of a preceding vehicle, the actual reaction force control amount dFact is also increased as shown in FIG. 40B. However, because the vehicle speed Vf is slower than the reference speed Vt, a small actual reaction force control amount dFact is applied to the accelerator pedal 82 compared with the case where the vehicle travels at the reference speed Vt.

At this time, the vehicle A and the preceding vehicle C above the vehicle A are displayed at the display monitor, as shown in FIG. 40C. Further, the area between the vehicle A and the preceding vehicle C is used as a reaction force display area, and the actual reaction force control amount dFact is displayed in stages using indicator bars. The road between the lane markers B is displayed using a color that is dark compared to the case where the vehicle speed Vf is faster than the reference speed Vt, i.e. the road is displayed using a color close to that used for displaying the preceding vehicle C and the actual reaction force control amount dFact.

When the risk potential RP exceeds the maximum value RPmax and becomes larger still as shown in FIG. 41A, the actual reaction force control amount dFact is fixed at the maximum value dFmax as shown in FIG. 41B. As a result, the maximum reaction force control amount is applied to the accelerator pedal 82. At this time, the vehicle A, preceding vehicle C and actual reaction force control amount dFact are displayed between the lane markers B as shown in FIG. 41C at the display monitor. The road between the lane markers B is displayed using a dark color, i.e. is displayed using a color close to that displayed for the preceding vehicle C and the actual reaction force control amount dFact because the vehicle speed Vf is slower than the reference speed Vt.

As described above in the third embodiment, the following operational effects are also obtained in addition to the results for the first and second embodiments described above.

(1) As with the modified example of the second embodiment described above, the controller 62 corrects the risk potential RP, and specifically the reaction force control amount dF, according to the difference (Vf−Vt) between the vehicle speed Vf and the reference speed Vt. The actual reaction force control amount dFact is then generated at the accelerator pedal 82 and displayed at the display device 110. As a result of displaying this actual reaction force control amount dFact, it is possible for a driver to easily recognize the extent of the reaction force generated at the accelerator pedal 82 using visual information. The actual reaction force control amount dFact takes a finite value contrary to the risk potential RP which takes an infinite value. Accordingly, when the actual reaction force control amount dFact reaches the maximum value dFmax, for instance, the driver is made aware of this using visual information.

(2) The necessary information determination unit 60C of the controller 62 compares the vehicle speed Vf and the reference speed V, and the display quantity calculator 60E changes display content of the display device 110 according to the comparison results. Specifically, the background color is set according to the results of comparing the vehicle speed Vf and the reference speed Vt. As a result, it is possible to intuitively convey information relating to the recommended speed Vt to the driver together with the actual reaction force control amount dFact.

In the third embodiment, the background color at the display monitor is always set to a dark color in cases where the vehicle speed Vf is slower than the reference speed Vt so that the contrast between the preceding vehicle and actual reaction force control amount dFact displayed at the display monitor and the background color is small. However, as with the second embodiment described above, even in cases where the vehicle speed Vf is slower than the reference speed Vt, when the risk potential RP is greater than the prescribed value RPa, the background color may be changed so that the contrast between the preceding vehicle C and actual reaction force control amount dFact and the background color becomes substantial.

In the first embodiment to the third embodiment, one example is given of conditions for displaying information relating to the risk potential RP and information relating to the reference speed shown in the drawings. However, the present invention is by no means limited to these display conditions, and various modifications are possible. For example, in FIG. 6A to FIG. 6C, the shape of the vehicle A may be differentiated from that of the preceding vehicle C, and the colors for displaying the preceding vehicle C and the risk potential RP may also be made different from each other.

Further, it is also possible to display only information relating to the reference speed expressing the impending risk to the vehicle at the display device 110 and to convey the risk potential RP expressing current risk to the vehicle to the driver via accelerator pedal reaction force. Display examples shown in FIG. 6A and FIG. 7A may be adopted when displaying only the information relating to the reference speed. In this case, it is possible for information to be conveyed to the driver in a manner that is easy to understand by conveying current risk as haptic information and impending risk as visual information.

In the first to third embodiments, reaction force dF to be generated at the accelerator pedal 82 is used as the excitation amount for conveying the risk potential to the driver through sense of touch but the present invention is by no means limited in this respect. For example, it is also possible to use reaction force control amount of a brake pedal as the excitation amount.

A system for conveying information relating to the risk potential RP and information relating to the reference speed Vt to the driver as visual information as described in the first embodiment to the third embodiment may be separated from a system for conveying the risk potential RP to the driver as sense of touch information (haptic information). In this case, a sense of touch controller equipped with an excitation amount calculator for calculating excitation amount from the risk potential RP and a visual controller equipped with a display amount calculating section for deciding display content from the risk potential RP can be provided independently. It is also possible to mount just a visual controller on a vehicle. Alternatively, it is also possible to only mount a haptic controller for conveying information relating to the risk potential RP and reference speed Vt to a driver through sense of touch on a vehicle. When only a haptic controller is mounted on a vehicle, the display device 110 for displaying the risk potential RP and/or information relating to reference speed Vt may be omitted.

While, in the second and third embodiments, the reaction force control amount dF is corrected according to the difference (Vf–Vt) between the vehicle speed Vf and the reference speed Vt so as to obtain the same results as for correcting the risk potential RP according to the vehicle speed difference (Vf–Vt), it is also possible to directly correct the risk potential RP.

In the first embodiment to the third embodiment described above, it is also possible to utilize, for example, radar employing a different method such as milliwave radar in place of the laser radar 10 as the sensor for detecting the traveling environment of the vehicle surroundings.

The above described embodiments are examples, and various modifications can be made without departing from the spirit and scope of the invention.

The disclosure of the following priority application is herein incorporated by reference:

Japanese patent application no. 2003-326500 filed Sep. 18, 2003

What is claimed is:

1. A driving assist system for vehicle comprising:
a traveling environment detection device that detects traveling environment of vehicle surroundings;
a risk potential calculating device that calculates a risk potential relating to a front-to-back direction of the vehicle based on detection results of the traveling environment detection device;
a reference speed calculating device that calculates a reference speed to be a reference for the vehicle to travel; and
a haptic information conveying device that conveys the risk potential calculated by the risk potential calculating device and information relating to the reference speed calculated by the reference speed calculating device to a driver via sense of touch.

2. A driving assist system for vehicle according to claim 1, wherein:
the haptic information conveying device conveys the risk potential and the information relating to the reference speed to the driver through an accelerator pedal reaction force.

3. A driving assist system for vehicle according to claim 2, further comprising:
a reaction force information determining device that determines information to be conveyed to the driver though the acceleration pedal reaction force from the risk potential and the information relating to the reference speed.

4. A driving assist system for vehicle according to claim 3, wherein:
the haptic information conveying device comprises (a) a risk potential correction device that corrects the risk potential based on the reference speed according to determination results of the reaction force information determining device, (b) an accelerator pedal reaction force calculating device that calculates a reaction force control amount to be generated at an accelerator pedal according to the corrected risk potential, and (c) an accelerator pedal reaction force generating device that generates the calculated reaction force control amount at the accelerator pedal.

5. A driving assist system for vehicle according to claim 4, wherein:
the reaction force information determining device compares a vehicle speed detected by the traveling environment detection device and the reference speed, and
the risk potential correction device corrects the risk potential calculated by the risk potential calculating device to be larger when it is determined by the reaction force information determining device that the vehicle speed is faster than the reference speed, and corrects the risk potential to be smaller when it is determined by the reaction force information determining device that the vehicle speed is slower than the reference speed.

6. A driving assist system for vehicle according to claim 4, wherein:
the reaction force information determining device compares the risk potential with a predetermined value; and
when the reaction force information determining device determines that the risk potential is smaller than the predetermined value, the risk potential correction device corrects the risk potential based on the reference speed in order to convey the information relating to the reference speed through the accelerator pedal reaction force.

7. A driving assist system for vehicle according to claim 1, further comprising:
a display device that displays the risk potential.

8. A driving assist system for vehicle according to claim 1, further comprising:
a display device that displays haptic information conveyed to the driver by the haptic information conveying device.

9. A driving assist system for vehicle according to claim 7, wherein:
the display device further displays the information relating to the reference speed.

10. A driving assist system for vehicle according to claim 9, further comprising:
a display information determining device that determines information to be conveyed to the driver by displaying on the display device from the risk potential and the information relating to the reference speed; and
a display content setting device that sets display content of the display device according to determination results of the display information determining device.

11. A driving assist system for vehicle comprising:
a traveling environment detection device that detects traveling environment of vehicle surroundings;
a risk potential calculating device that calculates a risk potential relating to a front-to-back direction of the vehicle based on detection results of the traveling environment detection device;
a reference speed calculating device that calculates a reference speed to be a reference for the vehicle to travel;
a haptic information conveying device that conveys the risk potential calculated by the risk potential calculating device to a driver via sense of touch; and
a display device that displays information relating to the risk potential and information relating to the reference speed calculated by the reference speed calculating device.

12. A driving assist system for vehicle according to claim 11, further comprising:
a display information determining device that determines information to be conveyed to the driver by displaying on the display device from the risk potential and the information relating to the reference speed.

13. A driving assist system for vehicle according to claim 12, further comprising:
a display content setting device that sets display content of the display device according to determination results of the display information determining device.

14. A driving assist system for vehicle according to claim 13, wherein:
the display information determining device compares a vehicle speed detected by the traveling environment detection device and the reference speed, and
the display content setting device changes the display content according to results of comparing the vehicle speed and the reference speed at the display information determining device.

15. A driving assist system for vehicle comprising:
a traveling environment detection device that detects traveling environment of vehicle surroundings;
a current risk calculating device that calculates an extent of current risk to the vehicle based on detection results of the traveling environment detection device;
an impending risk calculating device that estimates a level of impending risk relating to traveling of the vehicle;
a haptic information conveying device that conveys the extent of current risk calculated by the current risk calculating device to a driver as haptic information; and
a visual information conveying device that conveys the level of impending risk estimated by the impending risk calculating device to the driver as visual information.

16. A driving assist system for vehicle comprising:
a traveling environment detection means for detecting traveling environment of vehicle surroundings;
a risk potential calculating means for calculating a risk potential relating to a front-to-back direction of the vehicle based on detection results of the traveling environment detection means;
a reference speed calculating means for calculating a reference speed to be a reference for the vehicle to travel; and
a haptic information conveying means for conveying the risk potential calculated by the risk potential calculating means and information relating to the reference speed calculated by the reference speed calculating means to a driver via sense of touch.

17. A driving assist system for vehicle comprising:
a traveling environment detection means for detecting traveling environment of vehicle surroundings;
a current risk calculating means for calculating an extent of current risk to the vehicle based on detection results of the traveling environment detection means;
an impending risk calculating means for estimating a level of impending risk relating to traveling of the vehicle;
a haptic information conveying means for conveying the extent of current risk calculated by the current risk calculating means to a driver as haptic information; and
a visual information conveying means for conveying the level of impending risk estimated by the impending risk calculating means to the driver as visual information.

18. A vehicle driving assist method comprising:
detecting traveling environment of vehicle surroundings;
calculating a risk potential relating to a front-to-back direction of the vehicle based on the traveling environment thus detected;
calculating a reference speed to be a reference for the vehicle to travel; and
conveying the risk potential and information relating to the reference speed to a driver via sense of touch.

19. A vehicle driving assist method comprising:
detecting traveling environment of vehicle surroundings;
calculating an extent of current risk to the vehicle based on the traveling environment thus detected;
estimating a level of impending risk relating to traveling of the vehicle;
conveying the extent of current risk to a driver as haptic information; and
conveying the level of impending risk to the driver as visual information.

20. A vehicle comprising:
a driving assist system for vehicle that comprises (A) a traveling environment detection device that detects traveling environment of vehicle surroundings; (B) a risk potential calculating device that calculates a risk potential relating to a front-to-back direction of the vehicle based on detection results of the traveling environment detection device; (C) a reference speed calculating device that calculates a reference speed to be a reference for the vehicle to travel; and (D) a haptic information conveying device that conveys the risk potential calculated by the risk potential calculating device and information relating to the reference speed calculated by the reference speed calculating device to a driver via sense of touch.

21. A vehicle comprising:

a driving assist system for vehicle that comprises (A) a traveling environment detection device that detects traveling environment of vehicle surroundings; (B) a current risk calculating device that calculates an extent of current risk to the vehicle based on detection results of the traveling environment detection device; (C) an impending risk calculating device that estimates a level of impending risk relating to traveling of the vehicle; (D) a haptic information conveying device that conveys the extent of current risk calculated by the current risk calculating device to a driver as haptic information; and (E) a visual information conveying device that conveys the level of impending risk estimated by the impending risk calculating device to the driver as visual information.

* * * * *